(12) United States Patent
Andersson et al.

(10) Patent No.: US 11,078,039 B2
(45) Date of Patent: Aug. 3, 2021

(54) PILE PREPARATION UNIT WITH PILE TURNER

(71) Applicant: SCHUR TECHNOLOGY A/S, Horsens (DK)

(72) Inventors: Jonas Andersson, Eksjö (SE); Niklas Grandin, Ormaryd (SE); Stefan Gustavsson, Aneby (SE)

(73) Assignee: SCHUR TECHNOLOGY A/S, Horsens (DK)

( * ) Notice: Subject to any disclaimer, the term of this patent is extended or adjusted under 35 U.S.C. 154(b) by 215 days.

(21) Appl. No.: 16/305,404

(22) PCT Filed: May 29, 2017

(86) PCT No.: PCT/EP2017/062887
§ 371 (c)(1),
(2) Date: Nov. 29, 2018

(87) PCT Pub. No.: WO2017/207485
PCT Pub. Date: Dec. 7, 2017

(65) Prior Publication Data
US 2021/0016981 A1    Jan. 21, 2021

(30) Foreign Application Priority Data
May 30, 2016    (DK) .......................... PA 2016 70377

(51) Int. Cl.
*B65H 15/02*        (2006.01)
*B65G 59/06*        (2006.01)
*B65H 5/00*         (2006.01)

(52) U.S. Cl.
CPC ............. *B65H 15/02* (2013.01); *B65G 59/06* (2013.01); *B65H 5/006* (2013.01);
(Continued)

(58) Field of Classification Search
CPC ............. Y10S 414/106; Y10S 414/108; Y10S 414/107; Y10S 414/12; B65H 2301/332;
(Continued)

(56) References Cited

U.S. PATENT DOCUMENTS 2,520,252 A    8/1950   Cleveland
3,190,461 A *  6/1965   Postlewaite .............. B65G 1/00
                                                       414/765
(Continued)

FOREIGN PATENT DOCUMENTS

CN    202201543 U    4/2012
CN    203922168 U    11/2014
(Continued)

OTHER PUBLICATIONS

International Search Report—PCT/EP2017/062887.
(Continued)

*Primary Examiner* — Gregory W Adams
(74) *Attorney, Agent, or Firm* — Schmeiser, Olsen & Watts, LLP

(57) ABSTRACT

Provided is a pile preparation unit for changing a pallet support of a pile of sheets with a first end and a second end where the pallet has a support side supporting the pile of sheets at the first end. The pile preparation unit may include a rotation unit configured with an infeed opening for receiving a pallet with a pile of sheets, the rotation unit configured with a rotating structure to rotate a lift unit about a rotational axis. The lift unit is configured with a lift structure fixed to the rotating structure and has a lift plate movable along the lift structure to engage with the second end of the pile of sheets and to move and position the pile of sheets transverse, relative to the rotational axis, providing a portal for changing a pallet.

6 Claims, 15 Drawing Sheets

Figure 1:
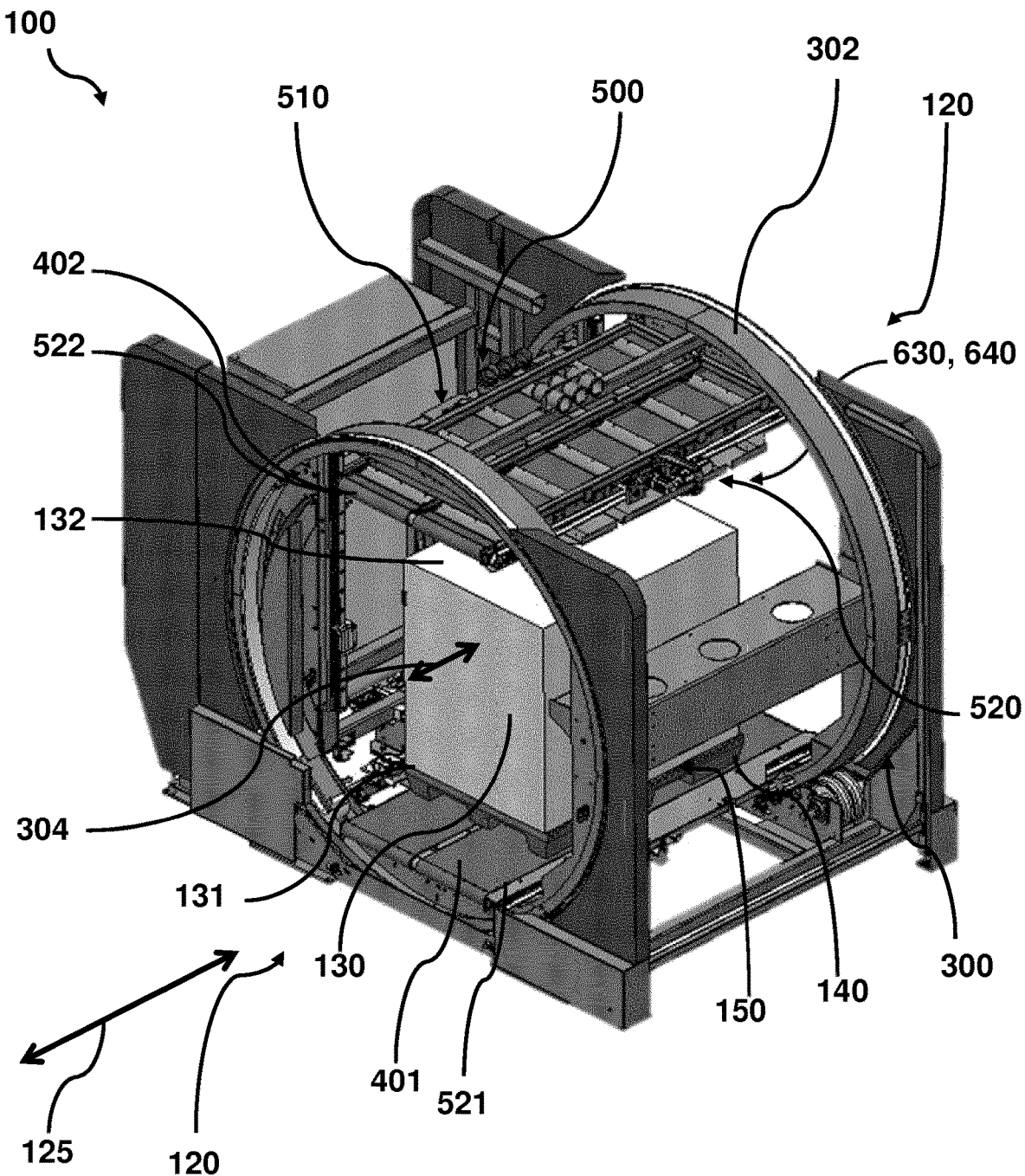

(52) U.S. Cl.
CPC . *B65H 2301/42264* (2013.01); *Y10S 414/106* (2013.01); *Y10S 414/108* (2013.01)

(58) Field of Classification Search
CPC .......... B65H 2301/33214; B65H 15/02; B65H 2301/42256; B65G 2814/0373; B65G 2201/0267; B65G 7/08; B65G 57/00; B65G 61/00
USPC .......................................... 414/927, 928, 929
See application file for complete search history.

(56) References Cited

U.S. PATENT DOCUMENTS

| | | | |
|---|---|---|---|
| 3,259,992 | A | 7/1966 | Bonwit et al. |
| 3,497,082 | A | 2/1970 | Flitter |
| 5,295,309 | A | 3/1994 | Kozlowski et al. |
| 7,284,946 | B2 * | 10/2007 | O'Neil .................. B65H 15/02 414/763 |

FOREIGN PATENT DOCUMENTS

| | | | | |
|---|---|---|---|---|
| CN | 105173203 | A | | 12/2015 |
| DE | 2628504 | | | 1/1978 |
| EP | 0683126 | A1 | | 11/1995 |
| EP | 2322433 | A1 | | 5/2011 |
| GB | 739678 | | | 11/1955 |
| GB | 769678 | | | 11/1955 |
| JP | S5325419 | U | | 3/1970 |
| JP | S5325419 | U | | 3/1978 |
| JP | H08252639 | A | | 10/1996 |
| JP | H10147435 | A | | 6/1998 |
| JP | 2001171828 | A | | 6/2001 |
| JP | 2010013230 | A | | 1/2010 |
| JP | 2010013230 | A | * | 1/2010 |
| WO | WO-2011138017 | A1 | * | 11/2011 ............. B65B 53/02 |

OTHER PUBLICATIONS

Written Opinion—PCT/EP2017/062887.
Danish Search Report dated Dec. 16, 2016 for Application PA 2016 70377.

* cited by examiner

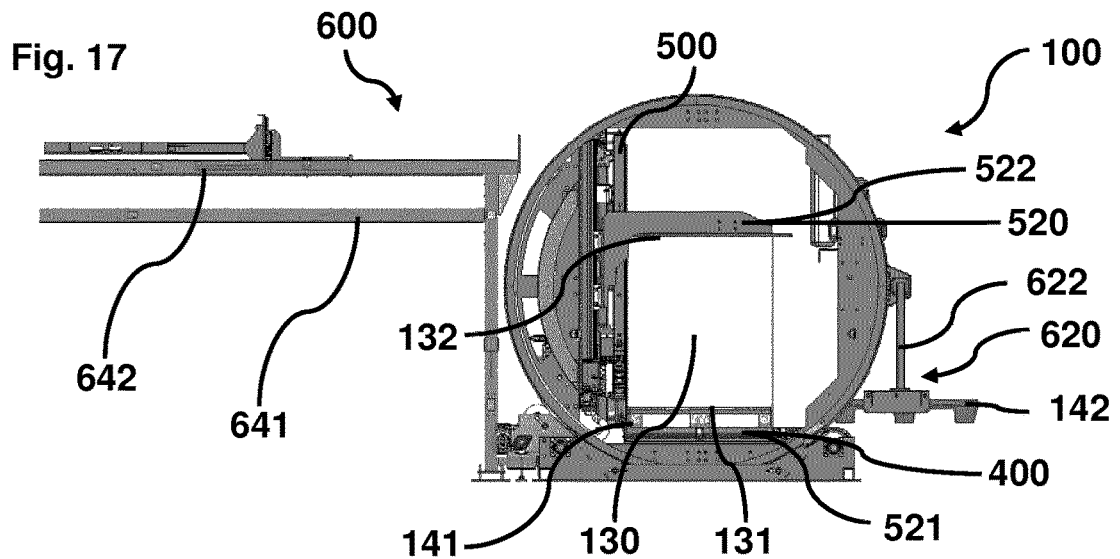
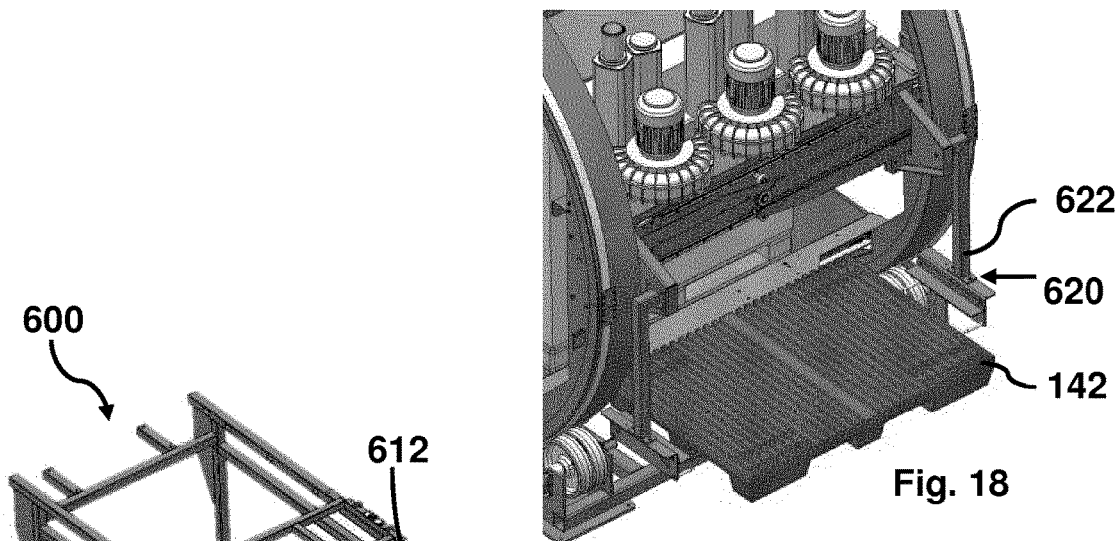
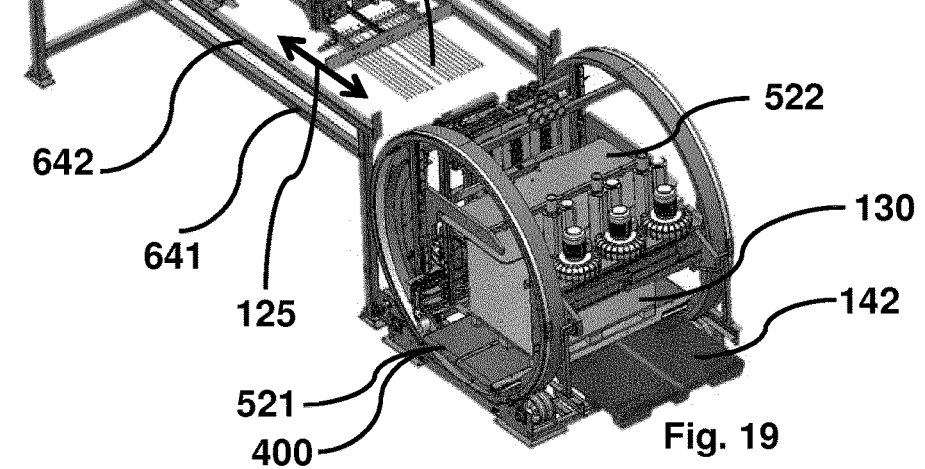

PILE PREPARATION UNIT WITH PILE TURNER

CROSS-REFERENCE TO RELATED APPLICATIONS

This application claims priority to PCT Application No. PCT/EP2017/062887, having a filing date of May 29, 2017, which is based on DK Application No. PA 2016 70377, having a filing date of May 30, 2016, the entire contents both of which are hereby incorporated by reference.

FIELD OF TECHNOLOGY

The following relates to a pile preparation unit for changing a pallet support of a pile of sheets with a first end and a second end where the pallet has a support side supporting the pile of sheets at the first end. The pile preparation unit may comprise a rotation unit configured with an infeed opening for receiving a pallet with a pile of sheets, the rotation unit configured with a rotating structure to rotate a lift unit about a rotational axis. The lift unit is configured with a lift structure fixed to the rotating structure and has a lift plate movable along the lift structure to engage with the second end of the pile of sheets and to move and position the pile of sheets transverse, relative to the rotational axis, providing a portal for changing a pallet.

Furthermore the embodiments relate to a method of changing a pallet support of a pile of sheets.

BACKGROUND

Preparing a pile of sheets for processing may require an in theory trivial task of turning the pile. However in practice such task may pose challenges. The pile may be distorted or in other ways be in disarray or misalignment.

Turning a pile of sheets may be required when the pile needs to be processed from the bottom end of the pile. One example is when the processing is printing on the backside or reverse-side of sheets in the pile.

Further challenges pose when the pile of sheets is on a pallet. Preparation for processing may also require a change of the pallet from one type of pallet to another type of pallet. The changing of a pallet may be from a disposable EUR-type of pallet to a process pallet.

JP 2010013230 discloses a pile preparation unit of the type mentioned by way of introduction. This unit does not allow automatic handling and to extract existing process pallet and reuse it and apply on same pile of sheets after turning the pile 180 degrees.

SUMMARY

An aspect relates to a pile preparation unit for changing a pallet support of a pile of sheets with a first end and a second end where the pallet has a support side supporting the pile of sheets at the first end.

The pile preparation unit may comprise a rotation unit configured with an infeed opening for receiving a pallet with a pile of sheets, the rotation unit configured with a rotating structure to rotate a lift unit about a rotational axis.

The lift unit is configured with a lift structure fixed to the rotating structure and has a lift plate movable along the lift structure to engage with the second end of the pile of sheets and to move and position the pile of sheets transverse, relative to the rotational axis, providing a portal for changing a pallet.

The rotating unit comprises a first conveyor configured to rotate with the rotating structure and the lift unit comprises a second conveyor configured as a second lift plate.

By a portal is understood a space or volume created where further actions or preparations can be performed. In particular this may involve actions or preparations where the pile of sheets being is to be prepared on a free end of the pile. Such actions may be a removal or extraction of a pallet, the insertion or delivery of a pallet, or both. Actions may also be a removal of sheets from the established free end of the pile.

The portal may be a space or volume inside the unit. The portal may also extend to include the exterior of the unit so that utilities may be transported in the portal or utilities may be applied in the portal. The portal may comprise different parts or sections where one part is for one action or one type of pallet and another part is for another action or another type of pallet.

The structure of the rotating unit allows automatic handling and to extract existing process pallet and reuse it and apply on same pile of sheets after turning the pile 180 degrees.

In an aspect of embodiments of the invention related to changing the location of a pallet from one side of a pile of sheets to the opposite side of the pile of sheets, the following aspects of embodiments of the invention is disclosed. The changing of the location of a pallet may also involve the exchange of a first pallet with a second pallet. The first pallet may be a disposable pallet such as a EUR-pallet and the second pallet may be a process pallet. A process pallet may be a type of pallet that is used in a specific clean environment.

In an aspect the lift unit comprises a first lift plate and a second lift plate, each configured to move and position in the lift structure to engage to the respective first end and second end of the pile of sheets.

Thereby providing a plate or face which position can be changed to support or carry a pile of sheets at the bottom and/or be removed from the top to generate the portal or space or volume required.

In an aspect the lift unit comprises a first conveyor and a second conveyor fixed to or configuring respective lift plates.

A conveyor will allow for a pallet to be transported into the unit, removed from the unit and to be positioned in the unit. There may be one conveyor. There may be two conveyors.

Advantageously, the conveyor has a flat form factor that will allow it to be rotated in the lift. Even more advantageously, two conveyors are arranged symmetrically allowing for receiving a pallet irrespective of which top or down position the unit has as a starting position. Whilst the conveyors may have the same or essentially the same form factor and be able to support or carry the weight of a same range of sizes and weight of objects, one conveyor may be for handing one type of objects and another conveyor for handling other types of objects.

In an aspect the pile preparation unit may further be configured with a pallet change module, comprising a pallet portal with movable pallet engagement means or engagement for engaging with a pallet for extraction from and insertion into a portal formed in an upper section of the rotation unit.

The pallet change module may be arranged for generating a portal for insertion or extraction from the end, such as the loading end or feeding end of the pile of sheets. The pallet change module may be arranged for generating a portal for insertion or extraction from the side of the unit.

In another aspect of embodiments of the invention related to exchanging one pallet of one type with another pallet of another type, the following aspects of embodiments of the invention are disclosed. The exchange may generally be of a first pallet with a second pallet. The first pallet may be a disposable type of pallet such as a EUR-pallet. The second pallet may be a so-called process pallet. Such process pallet may be configured or adapted to be operated or processed according to specific industrial settings.

In an aspect the pile preparation unit may be for exchanging a first pallet with a second pallet. The pallet change module may comprise a first pallet portal with movable first pallet engagement means or first pallet engagement arranged to extend to an extraction position in the rotation unit. The pallet change module may comprise a second pallet portal with movable second pallet engagement means or second pallet engagement, arranged to extend to a delivery position in the rotation unit the first and second pallet portal vertically separated.

The lift unit may be configured to move and position the lift plate for the pallet end of the pile of sheets to be positioned at the respective extraction position and delivery position.

The first and second pallet portals may be linear supports with guides for guiding pallet engagement means or pallet engagement. The first pallet portal may be arranged for a linear movement of the first pallet engagement means or first pallet engagement and with a space outside the rotation unit for loading a pallet. The pallet engagement means or pallet engagement may by the movement be inserted into the rotation unit in the portal volume to engage with a first pallet. The second pallet portal may be arranged similarly. The two pallet portals may be arranged above each other in the same support structure.

Having two pallet portals allows for parallel execution of actions, which allows for handling the first pallet in one fashion and the second pallets in another fashion. Furthermore having two pallet portals allows for faster actions in the rotation unit.

In an aspect the pallet change module is arranged on the side of the rotation unit and to extend the pallet engagement means or pallet engagement, the first or second or both pallet engagement means or pallet engagement into the rotation unit from a transverse direction to the rotational axis.

In an aspect the pile preparation unit may further comprise a pallet loading unit arranged on the opposite side of the pallet change module and fixed to the rotation unit. The pallet loading unit is configured to engage with and support a second pallet during rotation of the rotating unit and to release the second pallet on the second pallet engagement means or second pallet engagement.

The pallet loading unit may be configured with a pallet loading arm fixed to the rotating structure of the rotation unit and for engaging with a second pallet so that when the rotating unit rotates the pile of sheets the loading arm transports the second pallet, and turns it upside-down for delivery of the second pallet on the second pallet engagement means or second pallet engagement in the correct orientation for immediate insertion into the portal.

This arrangement greatly saves place and reduces the time of actions.

The pallet loading unit may be a unit for a PPU with a rotation unit. The pallet loading unit may be with a pallet loading arm connectable to the rotation unit and configured to engage with and support a pallet during a rotation of the rotating unit and configured to release the pallet when up-side down. The pallet loading unit may be configured to load a pallet from one side of the PPU and to rotate and turn the pallet up-side-down and deliver the pallet to a pallet change module with a pallet engagement means or pallet engagement that is arranged on the opposite side of the PPU.

An objective of embodiments of the invention may be achieved by a method of changing a pallet support of a pile of sheets with a first end and second end, where the pallet has a support side supporting the pile of sheets at the first end.

The method may comprise one or more of the following acts.

There may be an act of positioning the pallet supporting the pile of sheets on a first conveyor in a rotation unit.

There may be an act of engaging a second conveyor with the second end of the pile of sheets.

There may be an act of rotating the first and second conveyors upside down using the rotation unit.

There may be an act of releasing the first conveyor from the first end of the pile of sheets;

There may be an act of extracting the pallet from the first end of the pile of sheets.

There may be an act of engaging the first conveyor with the first end of the pile of sheets.

There may be an act of rotating the first and second conveyors downside up using the rotation unit. The act of rotating may be with our without the pallet.

There may be an act of releasing the second conveyor from the second end of the pile of sheets.

There may be an act of inserting the same pallet or another pallet on the second end of the pile of sheets.

There may be an act of engaging the second conveyor with the second end of the pile of sheets.

There may be an act of rotating the first and second conveyors upside down using the rotation unit. This may be done with or without a pallet.

There may be an act of ejecting the pallet supporting the pile of sheets from the second conveyor.

An aspect of embodiments of the invention may be achieved by a method of changing a pallet support of a pile of sheets with a first end and a second end, where the pallet has a support side supporting the pile of sheets at the first end. The changing may be an exchange of a first pallet with a second pallet.

The method may comprise one or more of the following acts.

There may be an act of positioning the pallet, supporting the pile of sheets on a first conveyor in a rotation unit.

There may be an act of engaging a lift plate arranged to move in a lift unit with the second end of the pile of sheets.

There may be an act of rotating the first pallet with the pile of sheets upside down using the rotation unit.

There may be an act of releasing the first conveyor from the first end of the pile of sheets by moving or lowering the lift plate, creating a portal for extraction and insertion of a pallet.

There may be an act of aligning the first pallet to an extraction position by moving the lift plate.

There may be an act of extracting the first pallet from the first end of the pile of sheets using the first pallet engagement means or first pallet engagement operated in the first pallet portal at the extraction position.

There may be an act of aligning the second end of the pile of sheets to an insertion position or delivery position. The act of aligning may be by moving the lift plate.

There may be an act of inserting the second pallet to the second end of the pile of sheets, using the second pallet engagement means or second pallet engagement operated in the second pallet portal at the insertion position or delivery position.

There may be an act of engaging the second pallet with the first conveyor by moving the lift plate.

There may be an act of rotating the second pallet with the pile of sheets downside up using the rotation unit.

Furthermore the method may comprise one or more of following acts.

There may be an act of attaching a second pallet of the second type on the outside of the rotation unit.

There may be an act of rotating the attached second pallet in the same rotation movement.

There may be an act of releasing the second pallet to the second pallet portal.

A first independent embodiment of the invention may be a conveyor with a belt for transporting an object between a first end and a second end of the conveyor. The conveyor may have a first belt drive transmission at the first end and a second belt drive transmission at the second end. The drive transmission may be configured as freewheel-types in respective directions.

The conveyor may have an intermediate transmission system arranged between the first end and the second end and having a first communication with the first belt drive transmission and having a second communication with the second belt drive transmission.

The conveyor may have a drive system in communication with a drive shaft in the intermediate transmission system, and may be configured to turn the drive shaft bidirectional in a first drive direction and a second drive direction.

The conveyor may be configured with the drive shaft having an intermediate communication with the first communication through a first intermediate transmission and the second communication through a second intermediate transmission.

The disclosed conveyor is compact and low weight, which allows for installation with in industrial process equipment. The conveyer may be adapted to be rotated in a pile preparation unit. The conveyor is reversible, and has a single centre positioned drive system. The conveyor may transport heavy loads and with an equal load and equal torque in the forward and reverse directions. The conveyor eliminates or counteracts any "push" forces on the belt.

In an aspect, the first intermediate transmission is configured for engagement and force transmission at a first engagement position in the first drive direction and a second engagement position in the second drive direction and in-between having a first path of un-engagement.

In an aspect, the second intermediate transmission is configured for engagement and force transmission at a first engagement position in the first drive direction and a second engagement position in the second drive direction and in-between having a second path of un-engagement.

In an aspect, the intermediate communication is arranged so that for the first drive direction, the first intermediate transmission is enabled for engagement at the first engagement position whilst the second intermediate transmission is in the second path of un-engagement. For the same aspect and for the second drive direction, the second intermediate transmission is enabled for engagement at the second engagement position whilst the first intermediate transmission is in the first path of un-engagement.

Thereby is achieved that the conveyor for the first drive direction, engages the first belt drive transmission for a first pull of the belt towards the first end whilst freewheeling the second belt drive transmission. For the second drive direction it is achieved that the second belt drive transmission engages for a second pull of the belt towards the second end whilst free-wheeling the first belt drive transmission.

Such conveyor will pull towards the respective first and second end whilst releasing tension in respective opposite ends. By pull is understood that traction power or a traction force is applied from the respective first or second end of the conveyor. This will allow the conveyor to transport heavy objects back and forth without building-up tension. A further advantage is that tensions are released during use situations of "asymmetric load" where a heavy object is transported in one direction, substantially offloaded and then reversed as a light object. A further advantage is that the configuration results in a flat structure of the conveyor in a direction transverse to the face of the belt for engaging with the object.

In an aspect the intermediate communication comprises an intermediate chain engaging with a drive cogwheel on the driveshaft, a first intermediate drive cogwheel on the first intermediate transmission and a second intermediate drive cogwheel on the second intermediate transmission. In an aspect the first and second communications comprise respective first and second communication chains engaging respective first and second belt cogwheels in the respective first and second belt drive transmissions with respective first and second communication cogwheels in the respective first and second intermediate transmissions. In an aspect the respective first and second intermediate transmissions each has a respective first and second intermediate drive cogwheel and a respective first and second communication cogwheel sharing respective common first and second intermediate shafts. Furthermore, the respective first and second intermediate transmission may be configured with engagement means or engagement to transmit force at least from the respective first and second drive intermediate cogwheels to the respective first and second communication cogwheels.

The intermediate transmission can apply a pull or traction force to the respective first and second ends of the conveyor. The engagement or appliance of a force then depends on the direction of rotation so that a pull or traction force is from one end of a conveyor for one direction of rotation of the drive and that a pull or traction force is from the other end of the conveyor for an opposite direction of rotation of the drive.

A second independent embodiment of the invention may be a pile preparation unit (PPU) for preparing a pile of sheets. The pile of sheets has a first end, which first end is optionally standing on a pallet, and opposite a free second end, a front edge side and a side edge side.

The PPU comprises a rotation base configured for standing on a floor and for supporting a rotation unit, configured with an infeed side for receiving a pile of sheets in a feed direction. The pile of sheets may optionally be on a pallet. The rotation unit may have a rotation unit frame with a rotation unit frame cross section. The rotation unit may be configured with an edge side support unit, configured with an edge side support face to support an edge side of the pile of sheets when the pile of sheets is in a rotated position to lean on the edge side support face. The rotation unit may have a lift unit configured to engage a lift plate to the free second end of the pile of sheets in the pile preparation position and to lift a pile of sheets.

In an aspect of the pile preparation unit (PPU), the rotation unit frame comprises two guides shifted in the feed direction relative to each other and each fixed to the rotation base and guiding a belt driven by a rotation unit drive system in the rotation base. The belt may be a timing belt. The belt may be a chain.

It is understood that the pile of sheets does not form part of the embodiments of the invention. However for clarity and understanding, the pile of sheets is an object to which the pile preparation unit is directed to. A person skilled in the art will thus appreciate modifications of the PPU according to variations in a size or shape of a pile of sheets.

Thus the PPU provides an effective and automated apparatus for preparing a pile of sheets for processing. The disclosed PPU may handle piles of sheets of a multiplicity of types of pile-shapes and -sizes as well as a multiplicity of sheet types and weights. The disclosed PPU saves time, the PPU allows for a quick setup for a new material in a pile of sheets. Piles prepared by the PPU will be more identical and PPU will provide a substantially constant throughput. The PPU may be fully integrated in an ERP system.

The rotation unit may rotate about a rotational axis, which axis may the feed direction. The rotation unit may be configured to rotate a conveyor about the feed direction. The conveyor may be configured to transport a pallet with a pile of sheets from the infeed side in the feed direction to a pile preparation position. In an aspect the belts encircle the conveyor.

A third independent embodiment of invention may be related to changing the location of a pallet from one side of a pile of sheets to the opposite side of the pile of sheets, the following aspects of embodiments of the invention is disclosed. The changing of the location of a pallet may also involve the exchange of a first pallet with a second pallet. The first pallet may be a disposable pallet such as a EUR-pallet and the second pallet may be a process pallet. A process pallet may be a type of pallet that is used in a specific clean environment.

In an aspect the rotating unit comprises a first conveyor configured to rotate with the rotating structure and the lift unit comprises a second conveyor configured as a second lift plate. This allows automatic handling and to extract existing process pallet and reuse it and apply on same pile of sheets after turning the pile 180 degrees.

In an aspect the lift unit comprises a first lift plate and a second lift plate, each configured to move and position in the lift structure to engage to the respective first end and second end of the pile of sheets.

Thereby providing a plate or face which position can be changed to support or carry a pile of sheets at the bottom and/or be removed from the top to generate the portal or space or volume required.

In an aspect the pile preparation unit may be for exchanging a first pallet with a second pallet. The pallet change module may comprise a first pallet portal with movable first pallet engagement means or first pallet engagement arranged to extend to an extraction position in the rotation unit. The pallet change module may comprise a second pallet portal with movable second pallet engagement means or second pallet engagement, arranged to extend to a delivery position in the rotation unit the first and second pallet portal vertically separated.

The lift unit may be configured to move and position the lift plate for the pallet end of the pile of sheets to be positioned at the respective extraction position and delivery position.

A fourth independent embodiment of the invention may be a pile preparation unit for changing a first pallet with a second pallet, the pallets for supporting a pile of sheets with a first end and second end where the pallet has a support side, supporting the pile of sheets at the first end and an opposite base side.

The pile preparation unit may comprise a rotation unit configured with an infeed opening for receiving a pallet with a pile of sheets. The rotation unit is configured with a rotating structure to rotate a lift unit about a rotational axis.

The lift unit may be configured with a lift structure fixed to the rotating structure and has a lift plate movable along the lift structure to engage with the second end of the pile of sheets and to move and position the pile of sheets transverse, relative to the rotational axis, providing a portal for changing a pallet.

The pallet preparation unit may comprise a pallet change module comprising a pallet portal with movable pallet engagement means or movable pallet engagement for engaging with a pallet, for extraction from and/or insertion into the portal formed in an upper section of the rotation unit, when the lift plate is in the lower section of the rotation unit.

By a portal is understood a space or volume created where further actions or preparations can be performed. In particular this may involve actions or preparations where the pile of sheets being is to be prepared on a free end of the pile. Such actions may be a removal or extraction of a pallet, the insertion or delivery of a pallet, or both. Actions may also be a removal of sheets from the established free end of the pile.

The pallet preparation unit may thus receive a pile of sheets and exchange one pallet with another pallet in an automated fashion. The rotation unit may comprise a unit frame with a rotation unit frame cross section. The rotation unit may be configured to rotate a conveyer about the feed direction. The conveyer may be configured to transport a pallet with a pile of sheets from the infeed side in the feed direction to a pile preparation position.

In an aspect the pallet change module comprises a first pallet portal with movable first pallet engagement means or first pallet engagement arranged to extend to an extraction position in the rotation unit.

The pallet change module may comprise a second pallet portal with movable second pallet engagement means or second pallet engagement arranged to extend to a delivery position in the rotation unit, where the first and second pallet portals are vertically separated.

The lift may be configured to move and position the lift plate for the pallet end of the pile of sheets to be positioned at the respective extraction position and delivery position.

In an aspect the pallet change module is arranged on the side of the rotation unit and to extend the pallet engagement means or pallet engagement, the first or second or both pallet engagement means or engagement into the rotation unit from a transverse direction to the rotational axis. The direction of insertion may be essentially horizontal and the pallet change module may be arranged on the side of the rotation unit relative to the infeed on a front. The pallet change module may comprise guides and supports as required to achieve a horizontal movement of a pallet. Likewise the engagement means or engagement are complementary in shape to the pallets. The engagement means or engagement may be adjustable to enable a fit to pallets of different types. A person skilled in the art will appreciate a need to perform adjustments and balance or dimension the construction as required for a pallet of a specific type to be moved in the pallet portal. Counterweights may be required. Similarly actuators may be required to adjust the position and the placement of the engagement means or engagement and thus the positioning of the pallet. The drive system may be a belt drive type of system that drives the movement. In one embodiment the first and second pallet engagement means or engagement may be identical.

In an aspect the pile preparation unit may further comprise a pallet loading unit arranged on the opposite side of the pallet change module and with a pallet loading arm fixed to the rotation unit. The pallet loading arm is configured to engage with and support a second pallet during rotation of the rotating unit and to release the second pallet on the second pallet engagement means or second pallet engagement. The pallet loading unit is configured to engage with and support a second pallet during rotation of the rotating unit and to release the second pallet on the second pallet engagement means or second pallet engagement. The pallet loading unit may be configured with a pallet loading arm fixed to the rotating structure of the rotation unit and for engaging with a second pallet so that when the rotating unit rotates the pile of sheets the loading arm transports the second pallet, and turns it upside-down for delivery of the second pallet on the second pallet engagement means or second pallet engagement in the correct orientation for immediate insertion into the portal.

A fifth independent embodiment of invention may be a pile sheet remover system (PSR) for preparing a pile of sheets with a height, a free end, and a side of sheet edges for processing in a pile preparation unit (PPU).

The PSR may comprise a sheet removing unit having a support frame supporting a moving frame, configured for a linear movement in an attack direction towards the side and the free end of the pile of sheets.

The moving frame may have a side support plate with a side support face arranged to face and apply to the side of the pile of sheets.

The PSR may have a grab plate arranged with a grab face essentially perpendicular to the side support face and extending beyond the side support face in the attack direction, configured with a grab actuator for a grab movement towards the free end of the pile of sheets.

The PSR may have one or more attack knives arranged below the grab plate to face the side of the pile of sheets, and configured with one or more attack actuators for a first attack movement in the attack direction for insertion of the one or more attack knives between a pair of sheets, i.e. between two adjacent sheets It is thereby achieved that top sheets can be removed automatically. Furthermore the arrangement can be adjusted according to different characteristics of a pile of sheets. A further advantage is that the system can be arranged in a pile preparation unit, which in other aspects such are turning the pile, airing the pile or changing of a pallet or the location of the pallet.

In an aspect there is a first attack knife for a first attack movement and a second attack knife for a second attack movement. The first attack knife may be a smaller knife with a blade in the attack direction. The first knife may be a razor blade type of knife. The second attack knife may be larger than the first knife and with a sharp and point type of form in the attack direction. The knife may also be a stylus type of shape.

In an aspect one or more second attack knives are configured with one or more transverse actuators for a movement transverse to the line of attack direction and parallel to the sheet edges. The knives used for the transverse movement may be second attack knives. There may be one knife for a transverse movement from a center area to a periphery. There may be another knife for a transverse movement from the center area to a periphery on the other side. There may be two second attack knives, each being configured with individual transverse actuators.

This effectively separates sheets to be removed from the remaining sheets. A further advantage is that the transverse movement leaves the knives in a favorable position when the actual removal takes place and thus decreases the risk of destroying the sheets.

In an aspect one or more first attack knives are configured with one or more edge lift actuators for a lift movement transverse to the line-of-attack direction and perpendicular to the sheet edges. The lift movement lifts the edge of the sheets upwardly and thus makes it possible for a further insertion into the sheets. Advantageously the movement is performed swiftly to increase the separation of sheets. The lift actuators may be pneumatic actuators. The actuators may be adjustable in action length or speed.

In an aspect one or more attack knives are configured for a second attack movement extending the first attack movement in the attack direction for further insertion of the one or more attack knives between the pair of sheets. This second movement may be provided by the same actuator used for the first movement. The second movement may also be provided by additional actuators. Thus there may be a first set of actuators and a second set of actuators.

BRIEF DESCRIPTION

Figure 2:
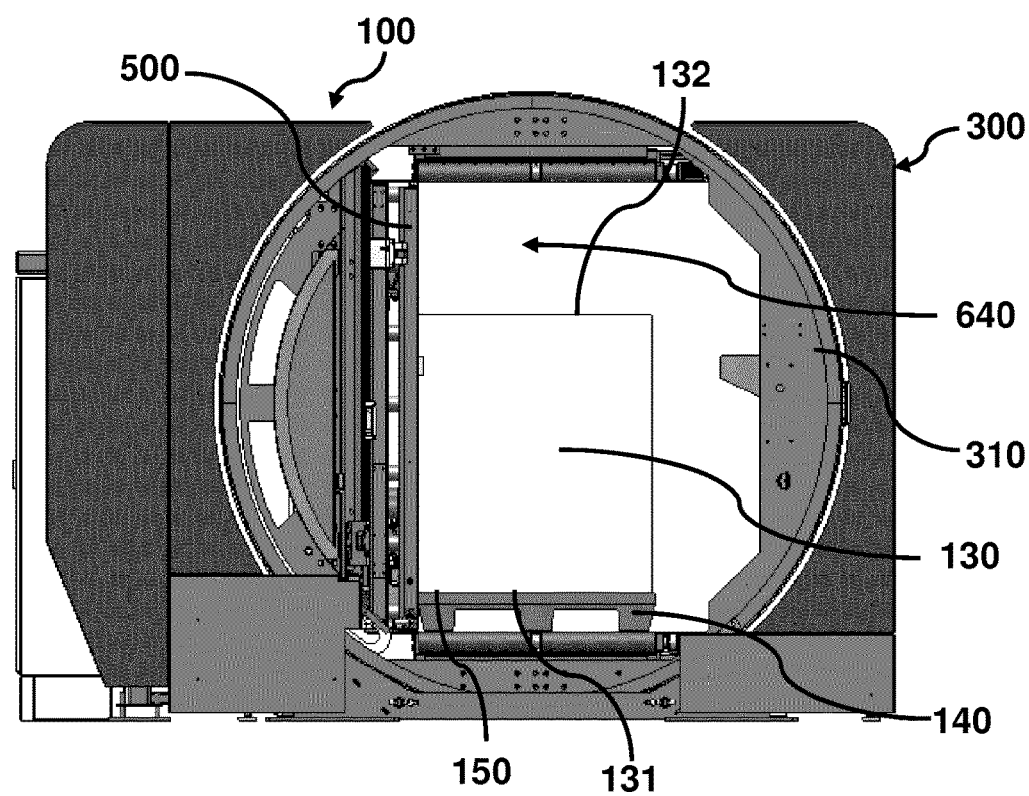
Figure 3:
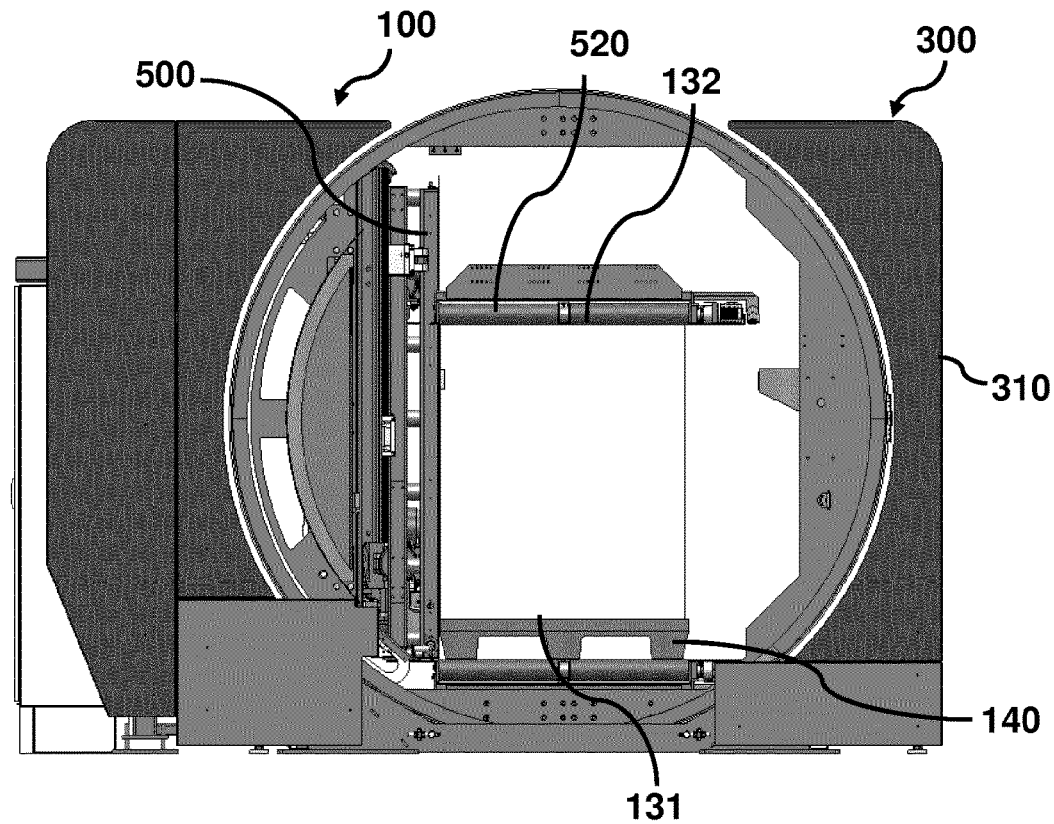
Figure 4:
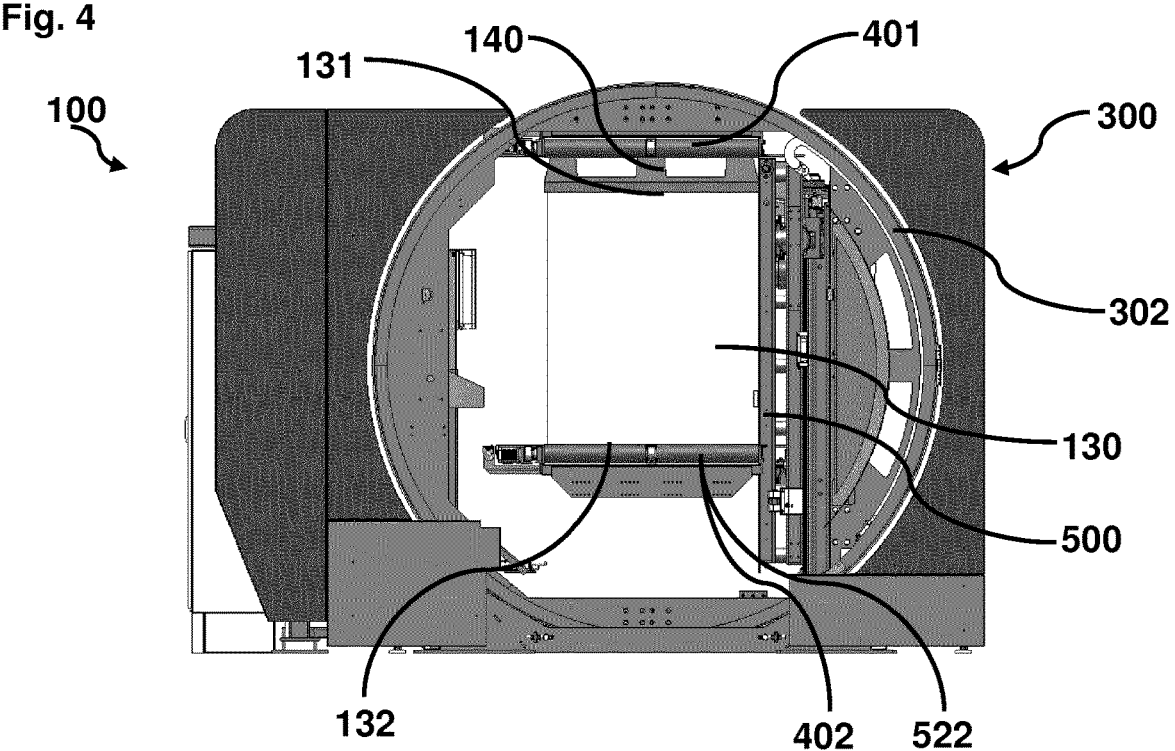
Figure 5:
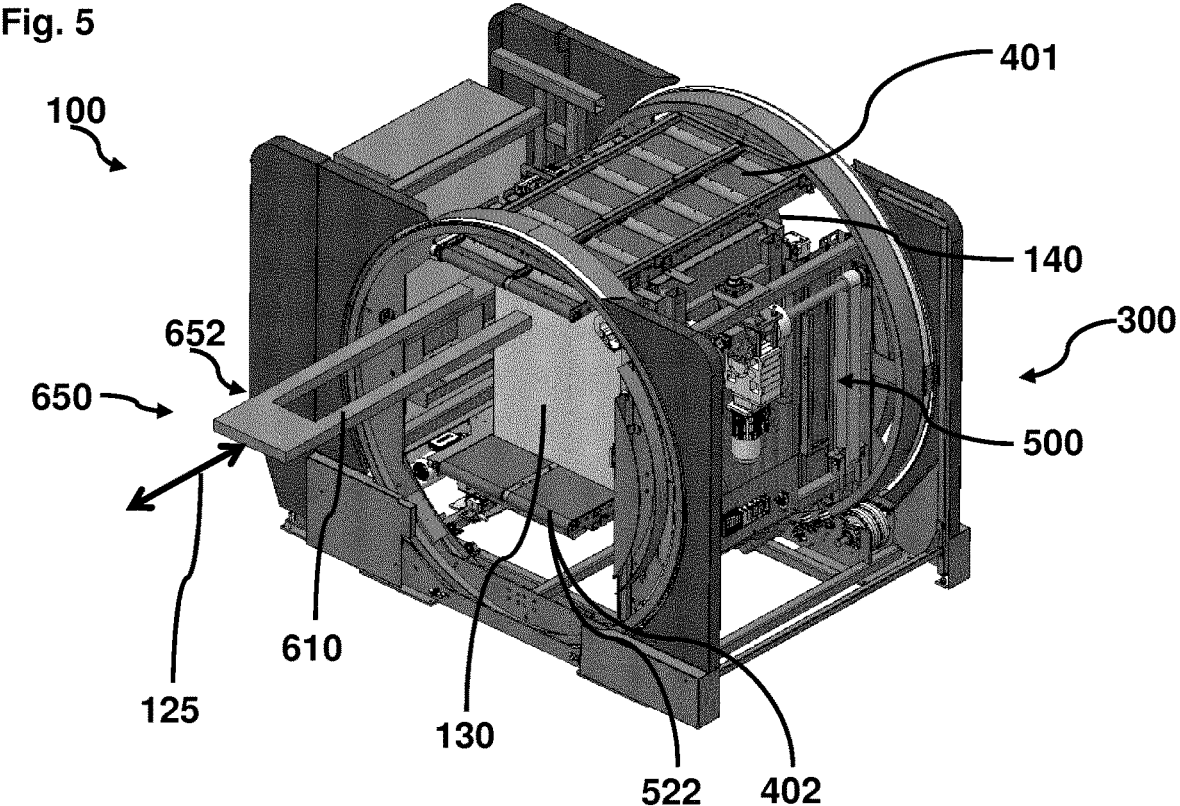
Figure 6:
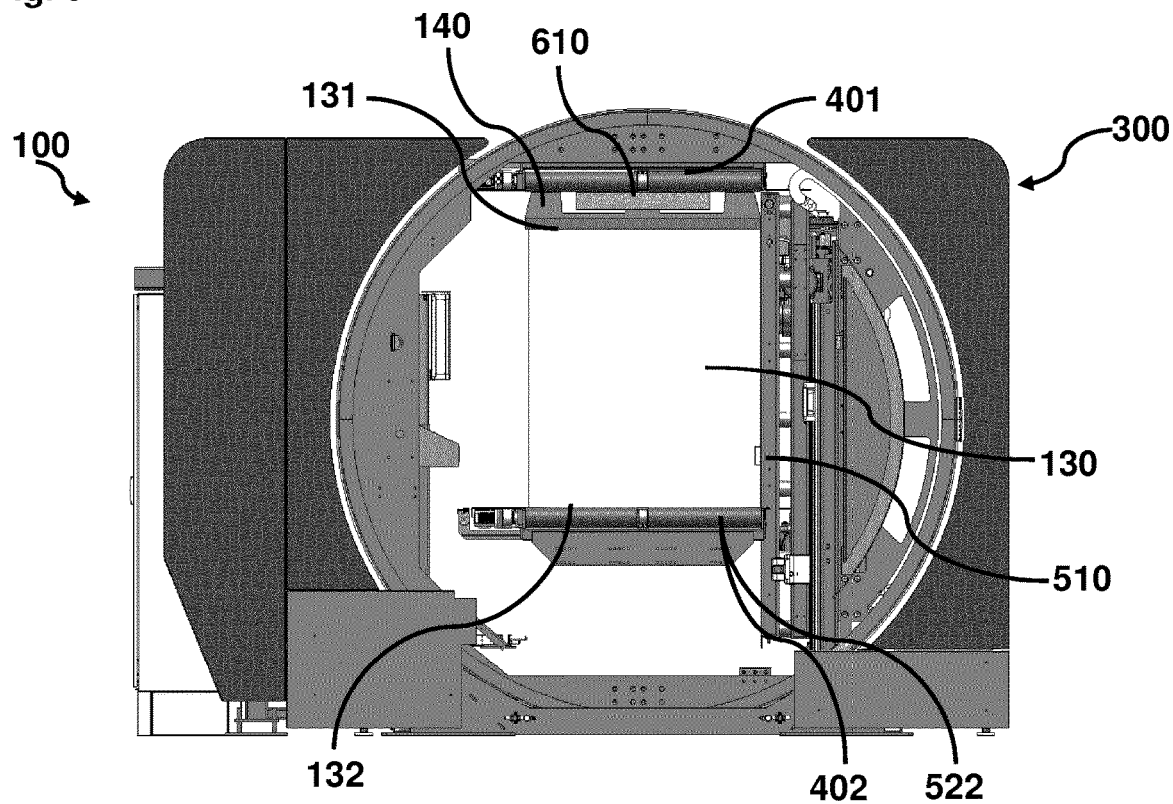
Figure 7:
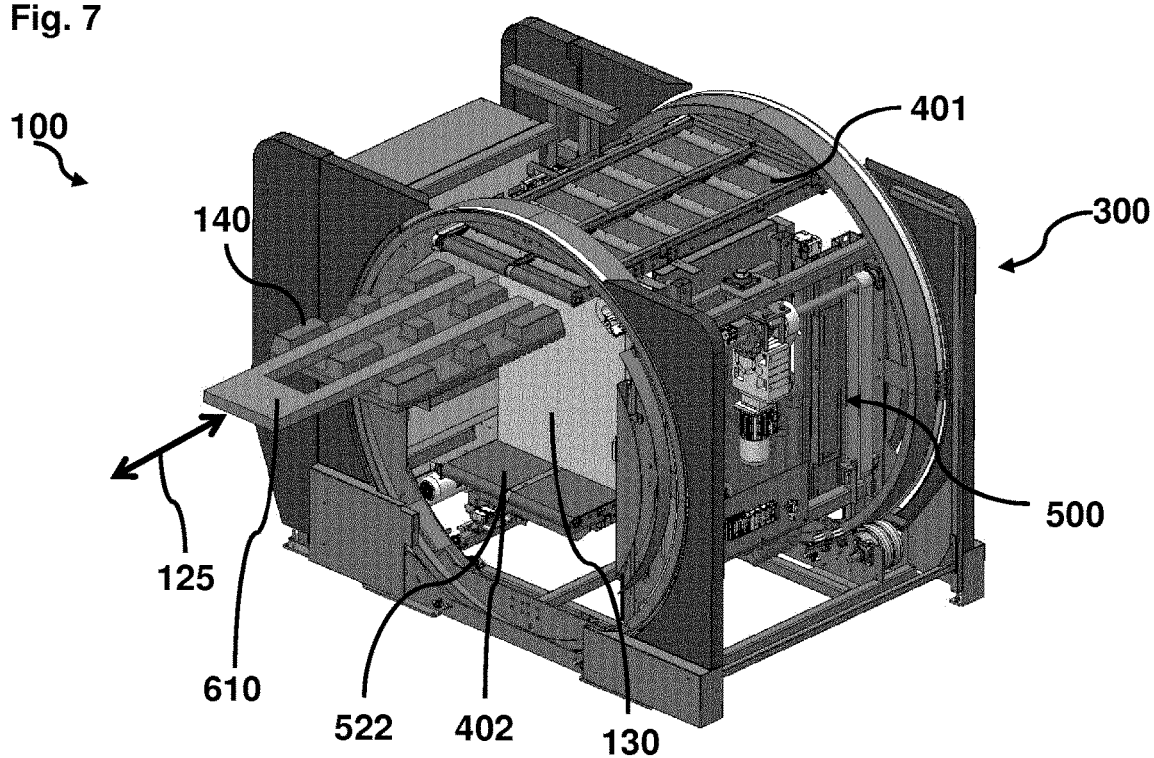
Figure 8:
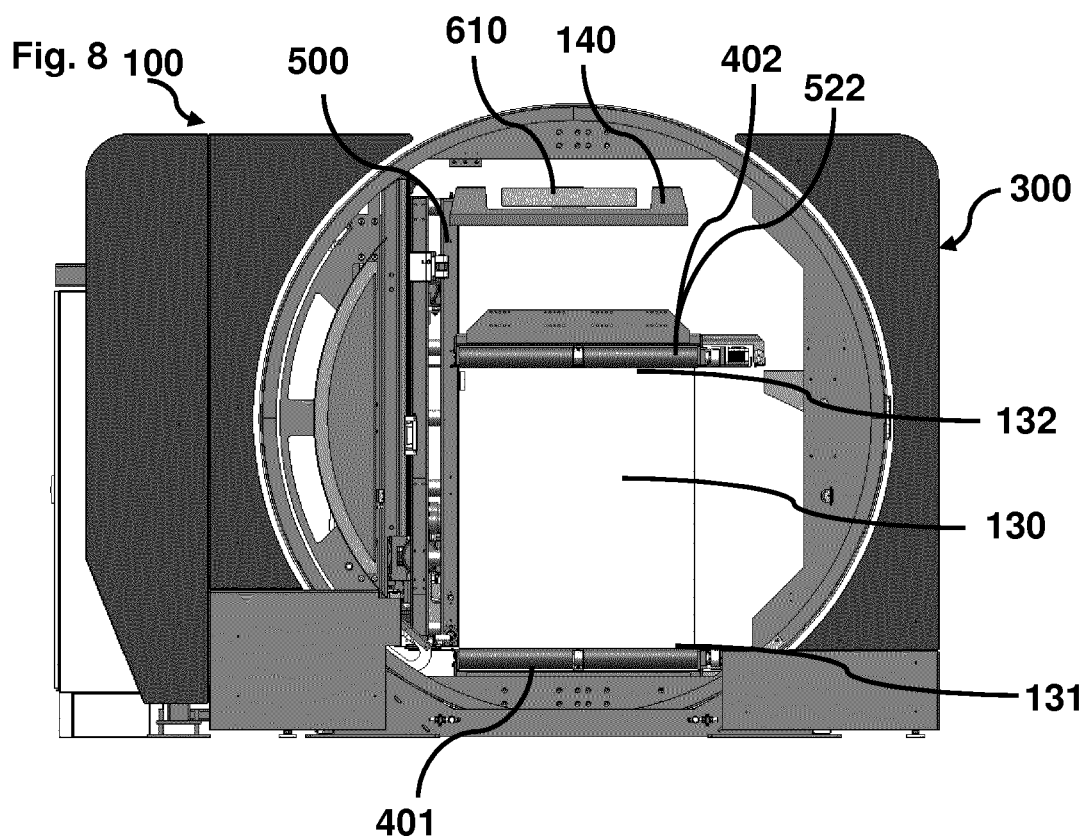
Figure 9:
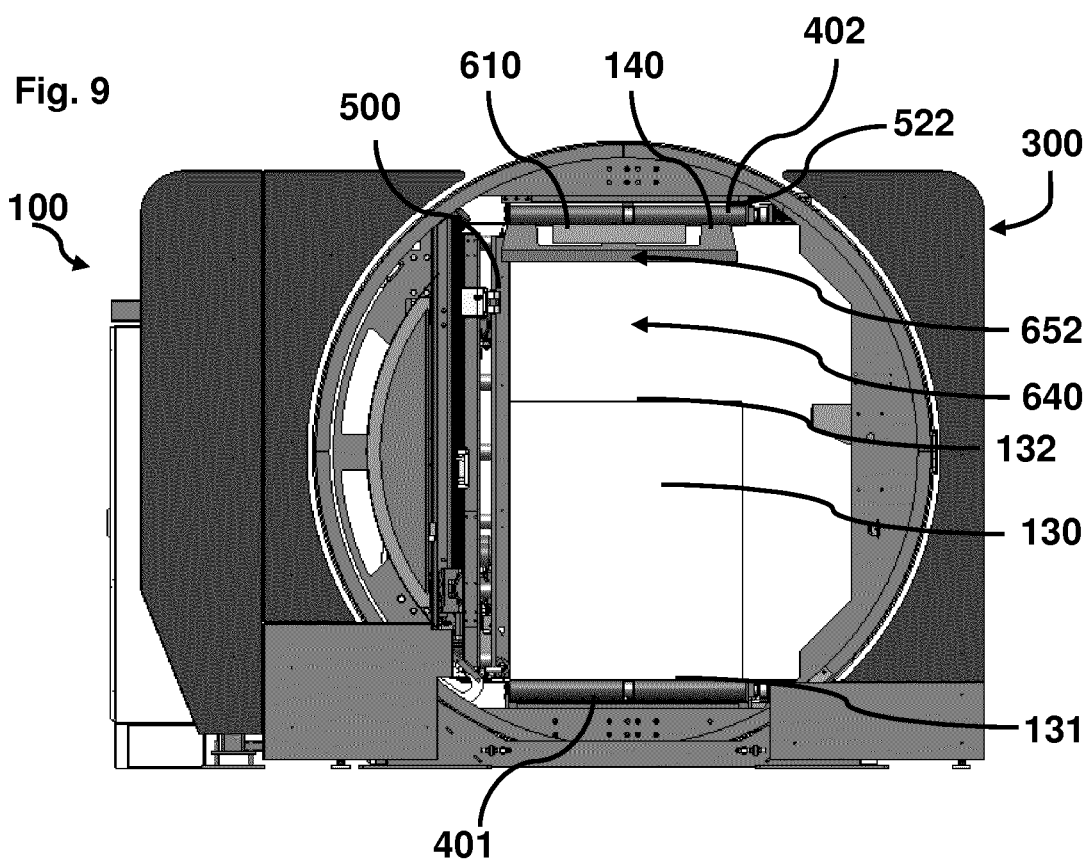
Figure 10:
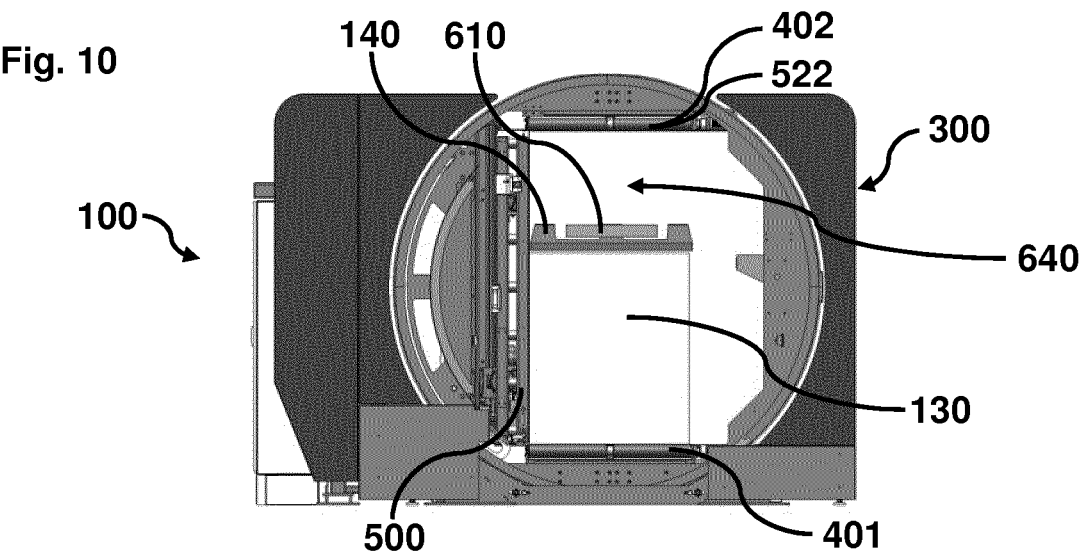
Figure 11:
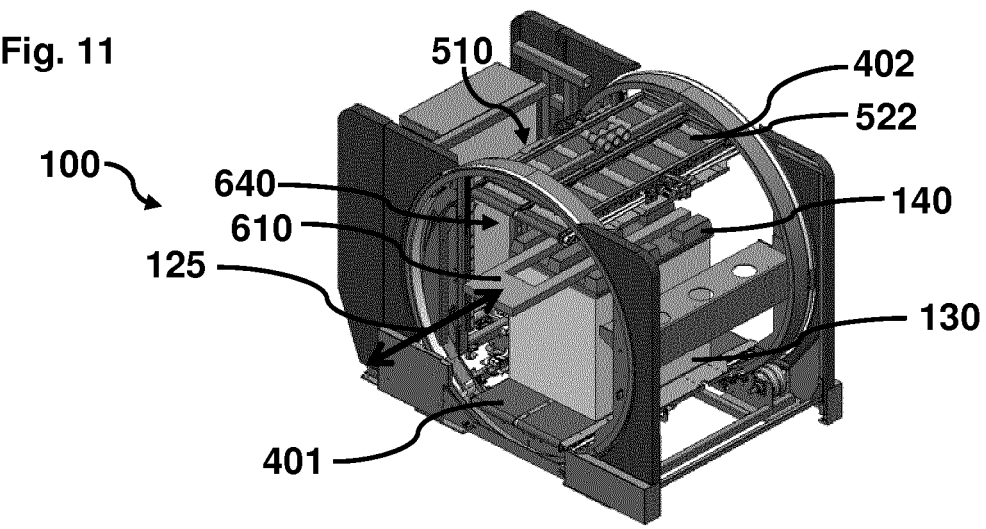
Figure 12:
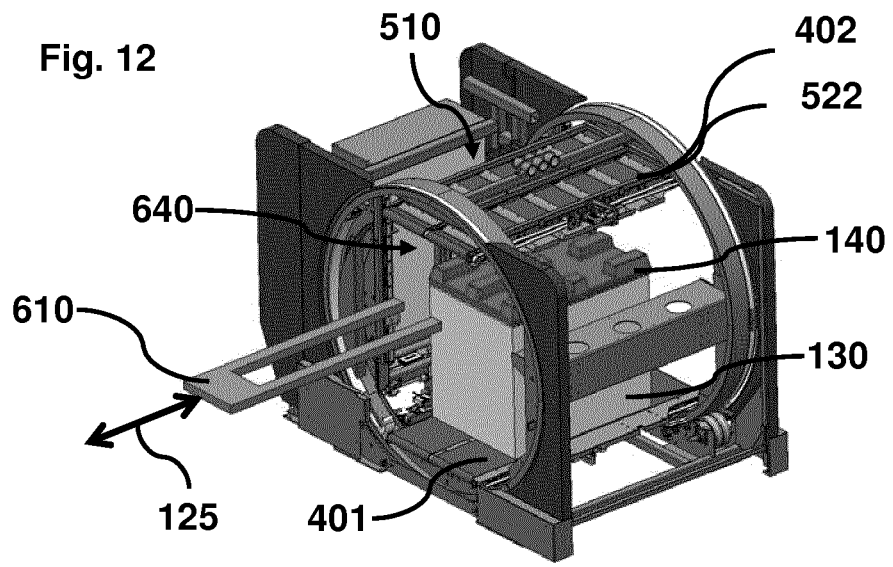
Figure 13:
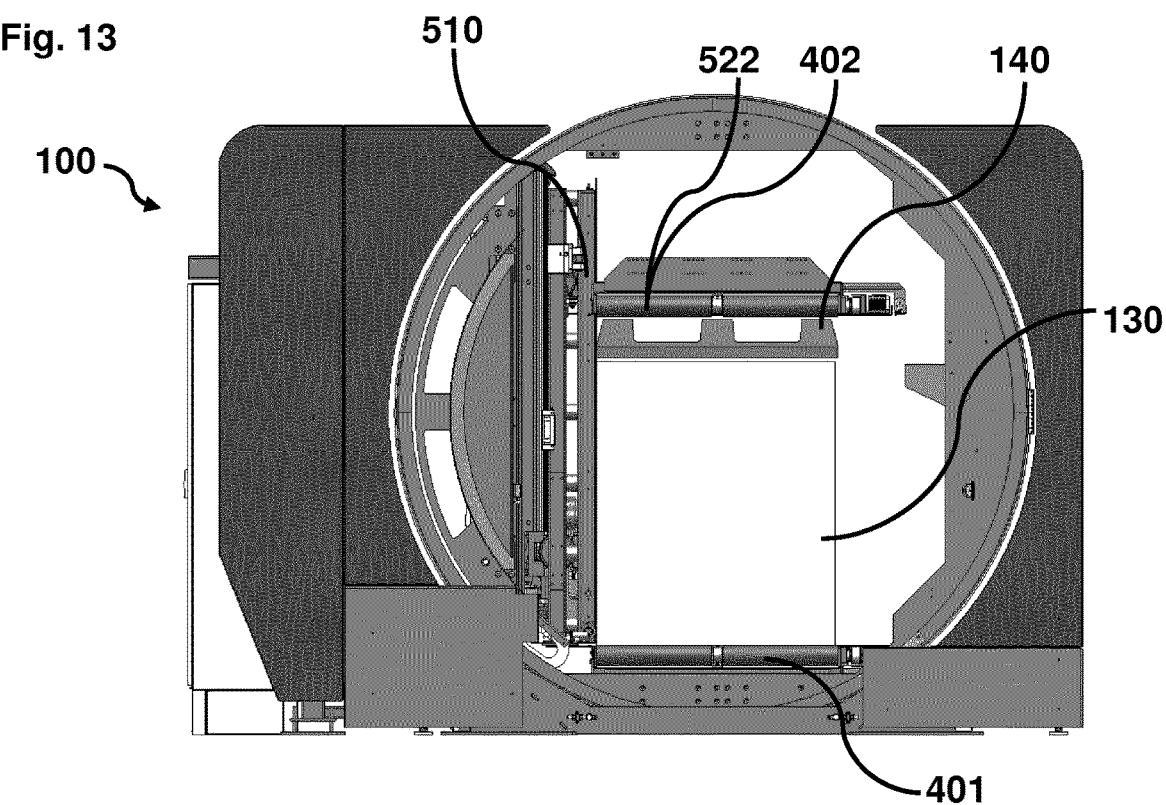
Figure 14:
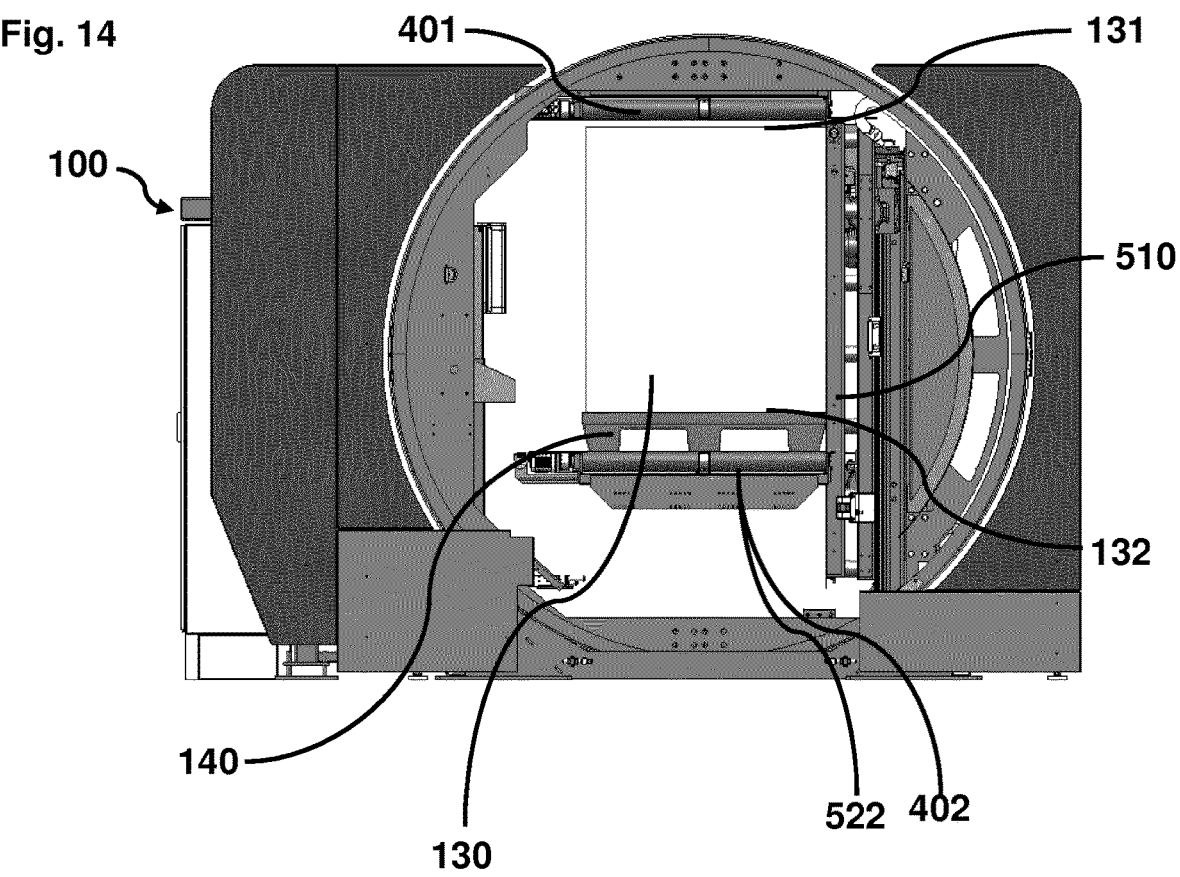
Figure 15:
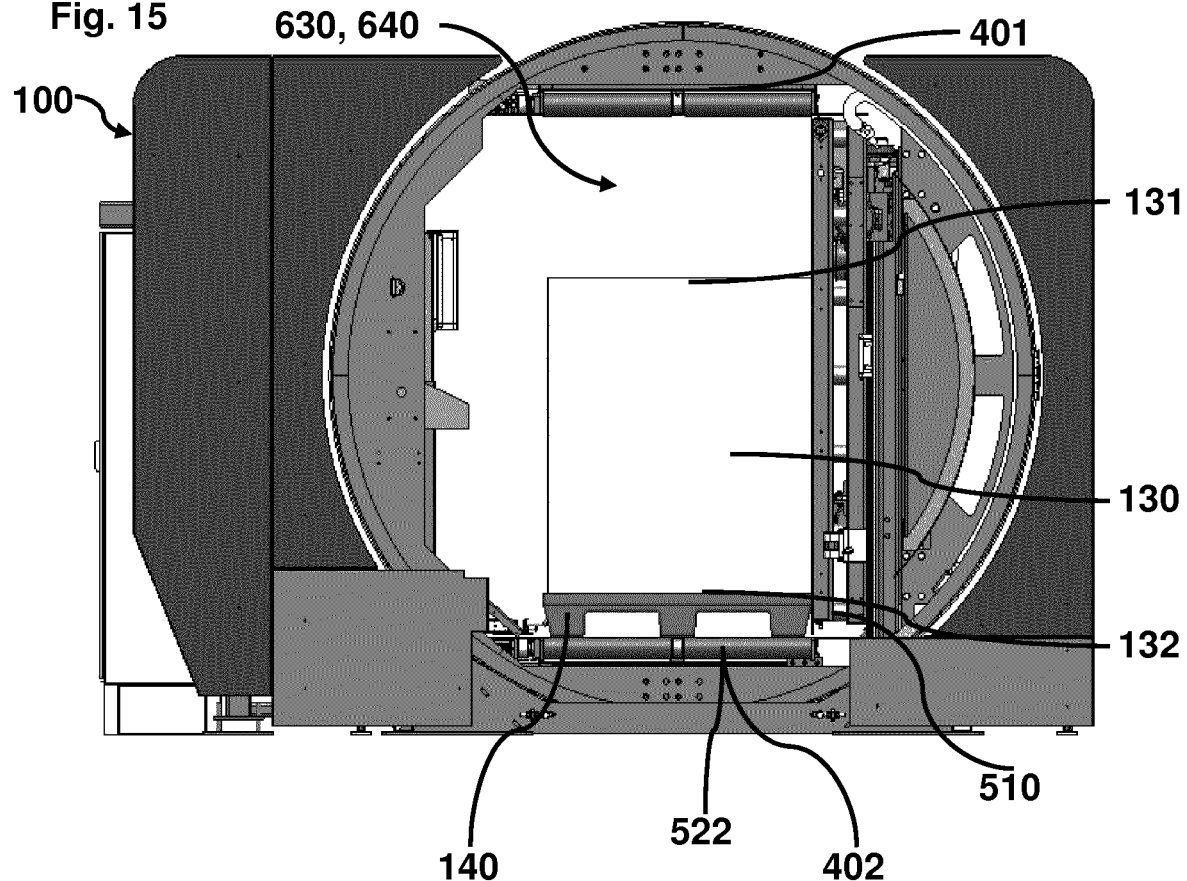
Figure 16:
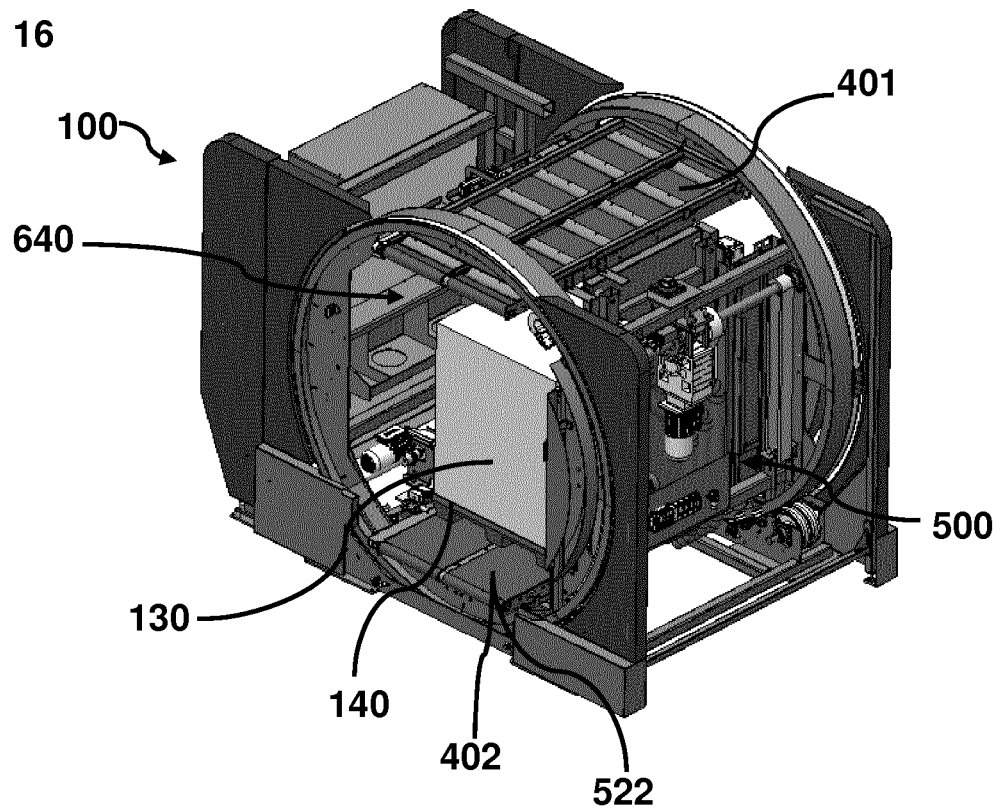
Figure 20:
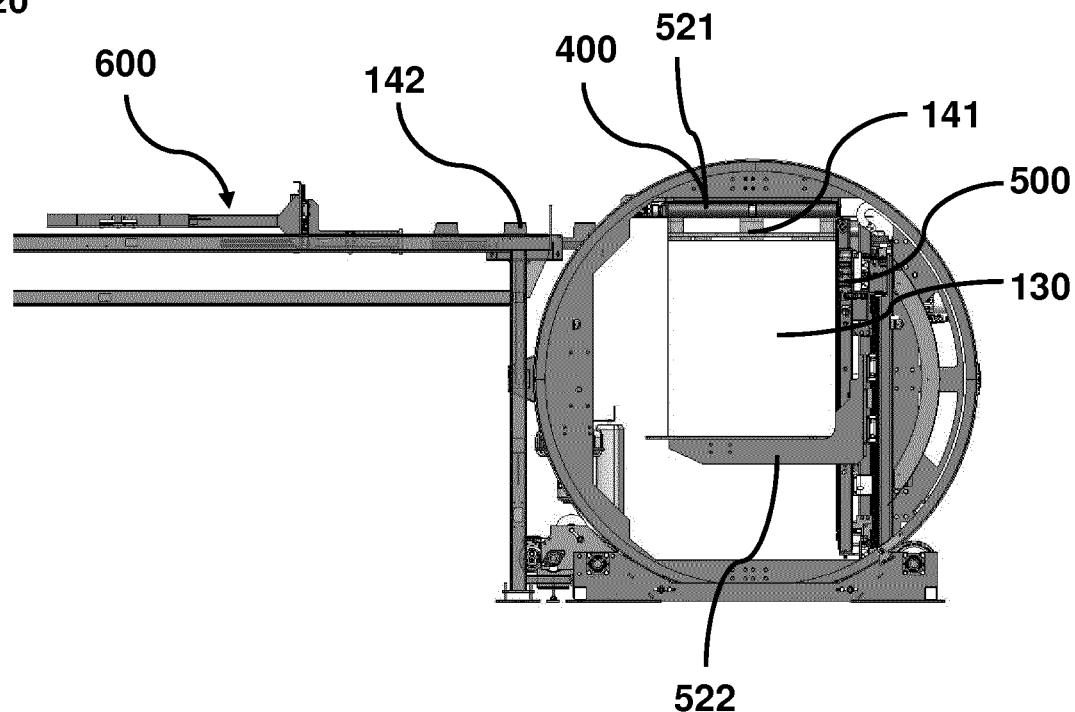
Figure 21:
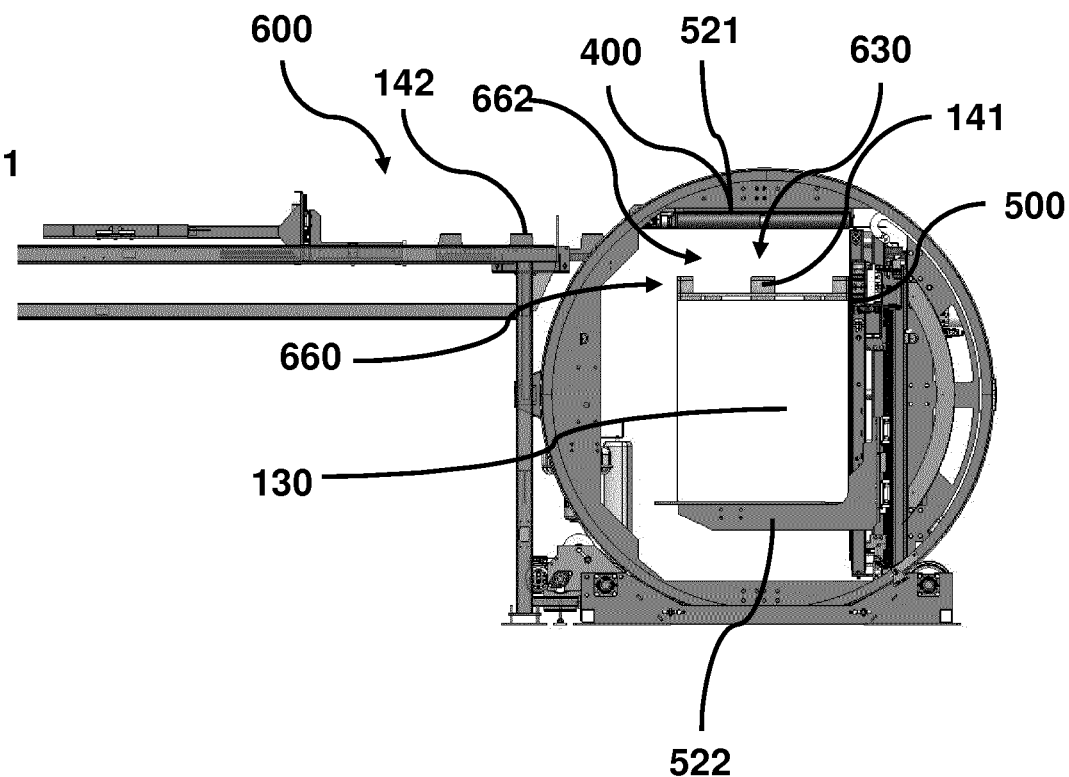
Figure 22:
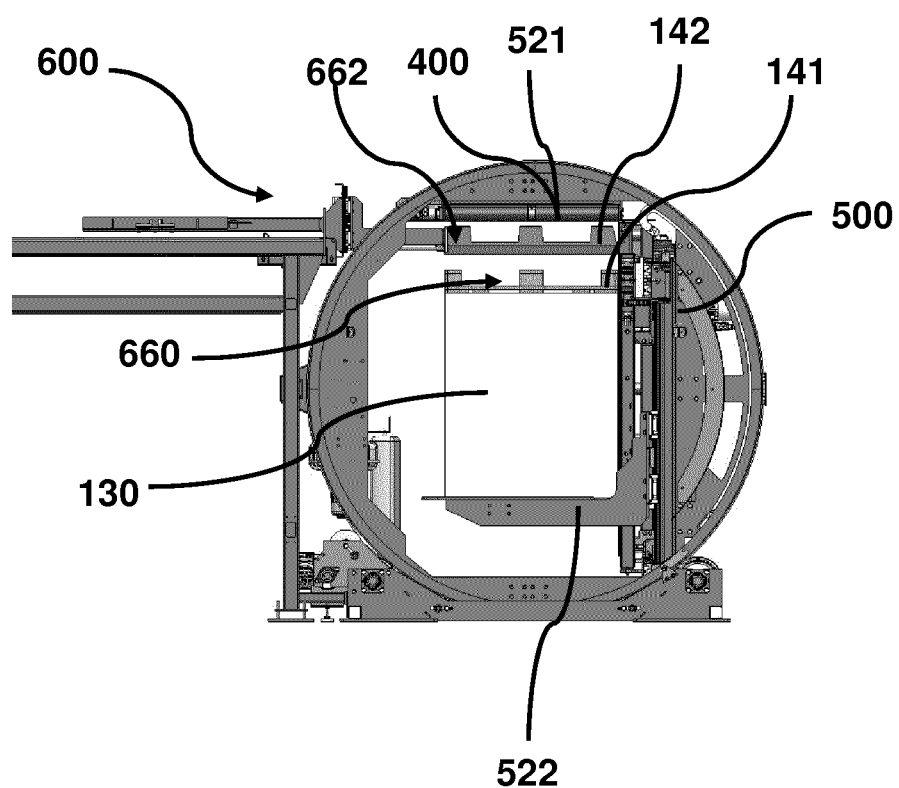
Figure 23:
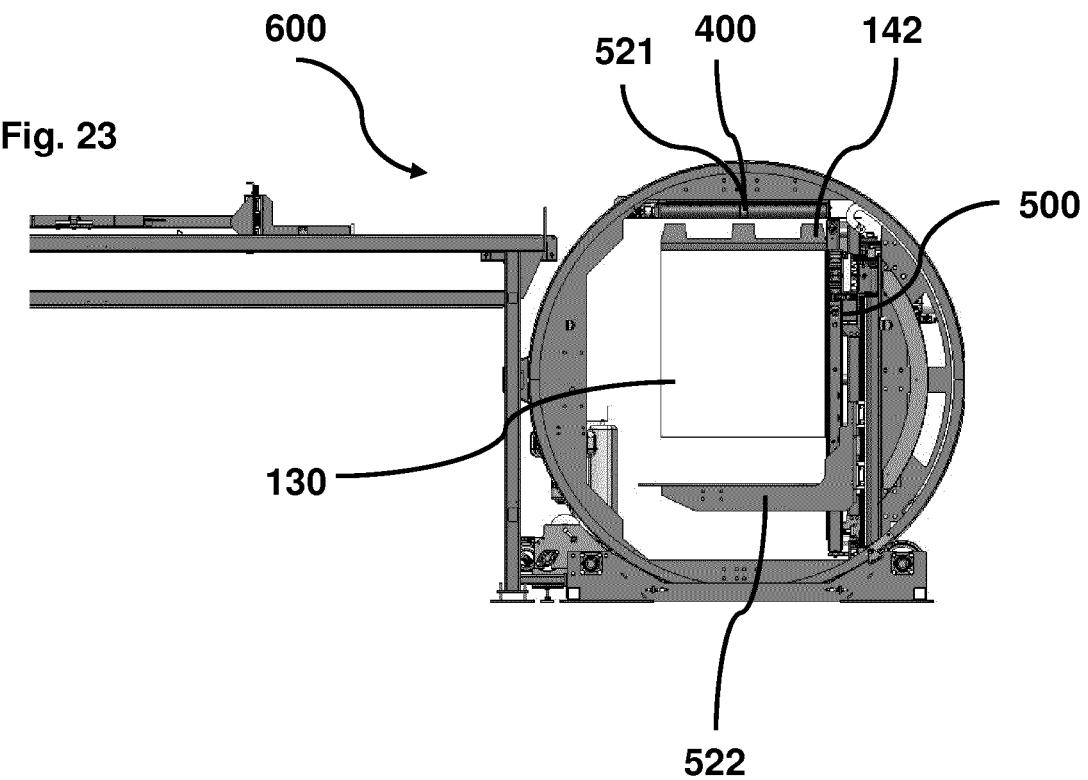
Figure 24:
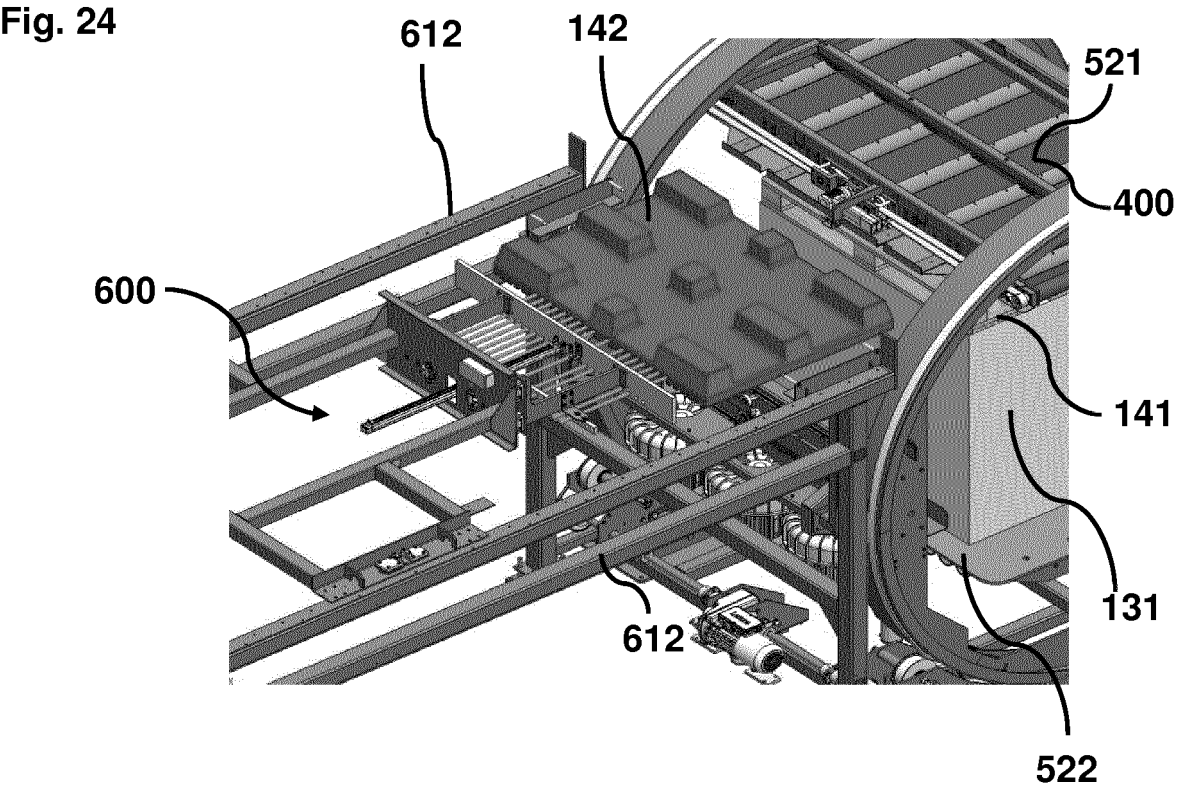
Figure 25:
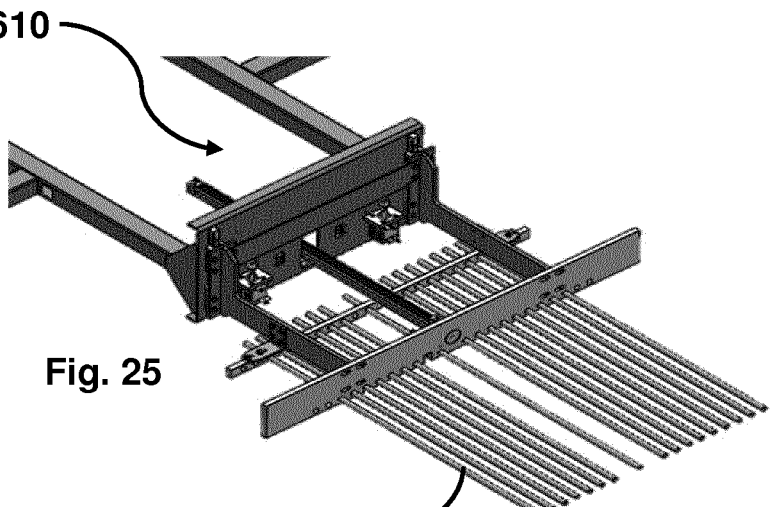
Figure 26:
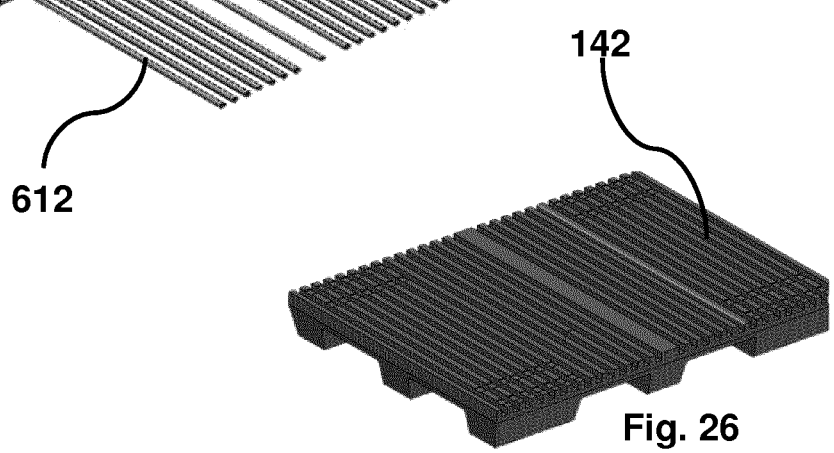
Figure 27:
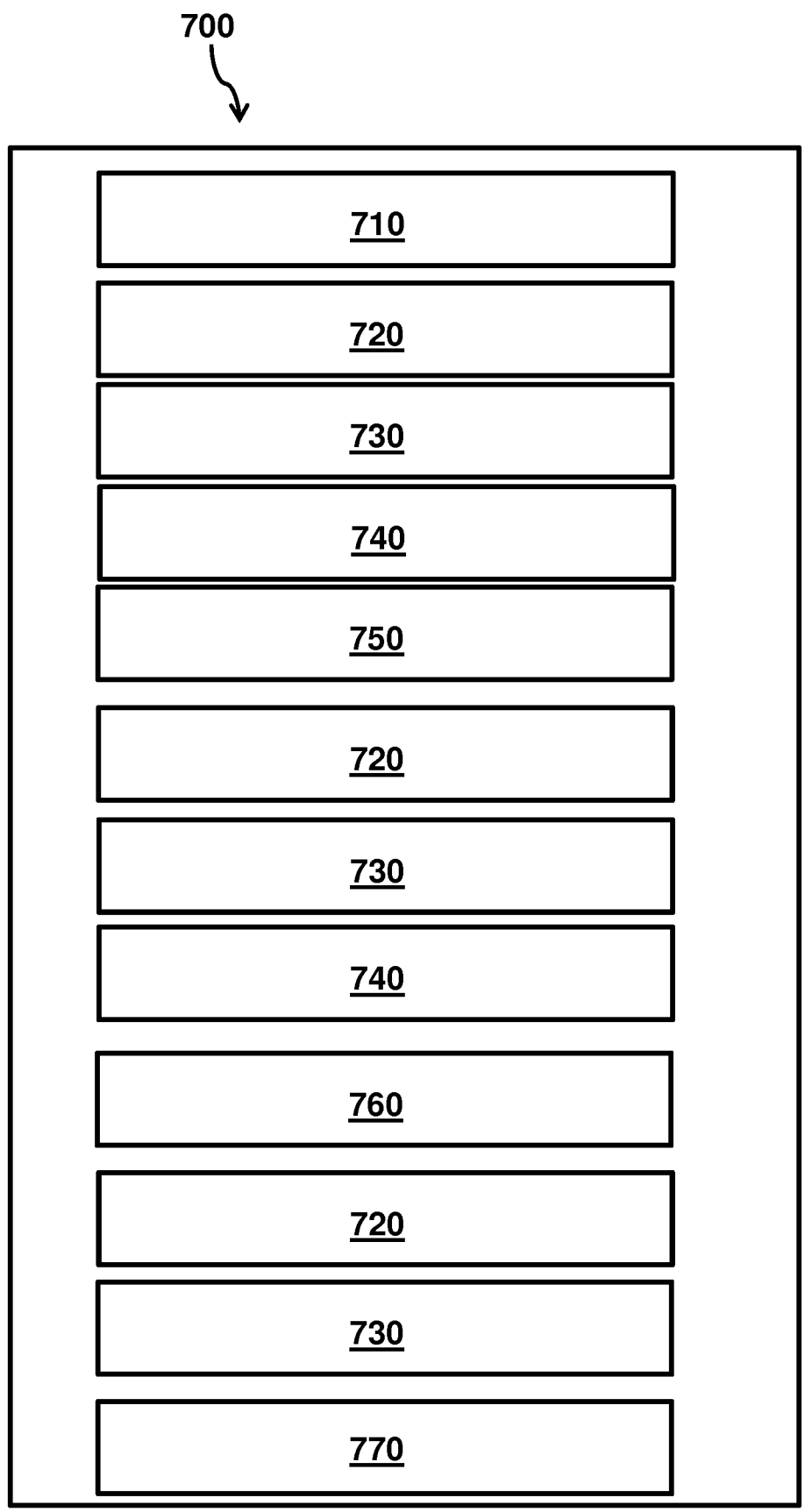
Figure 28:
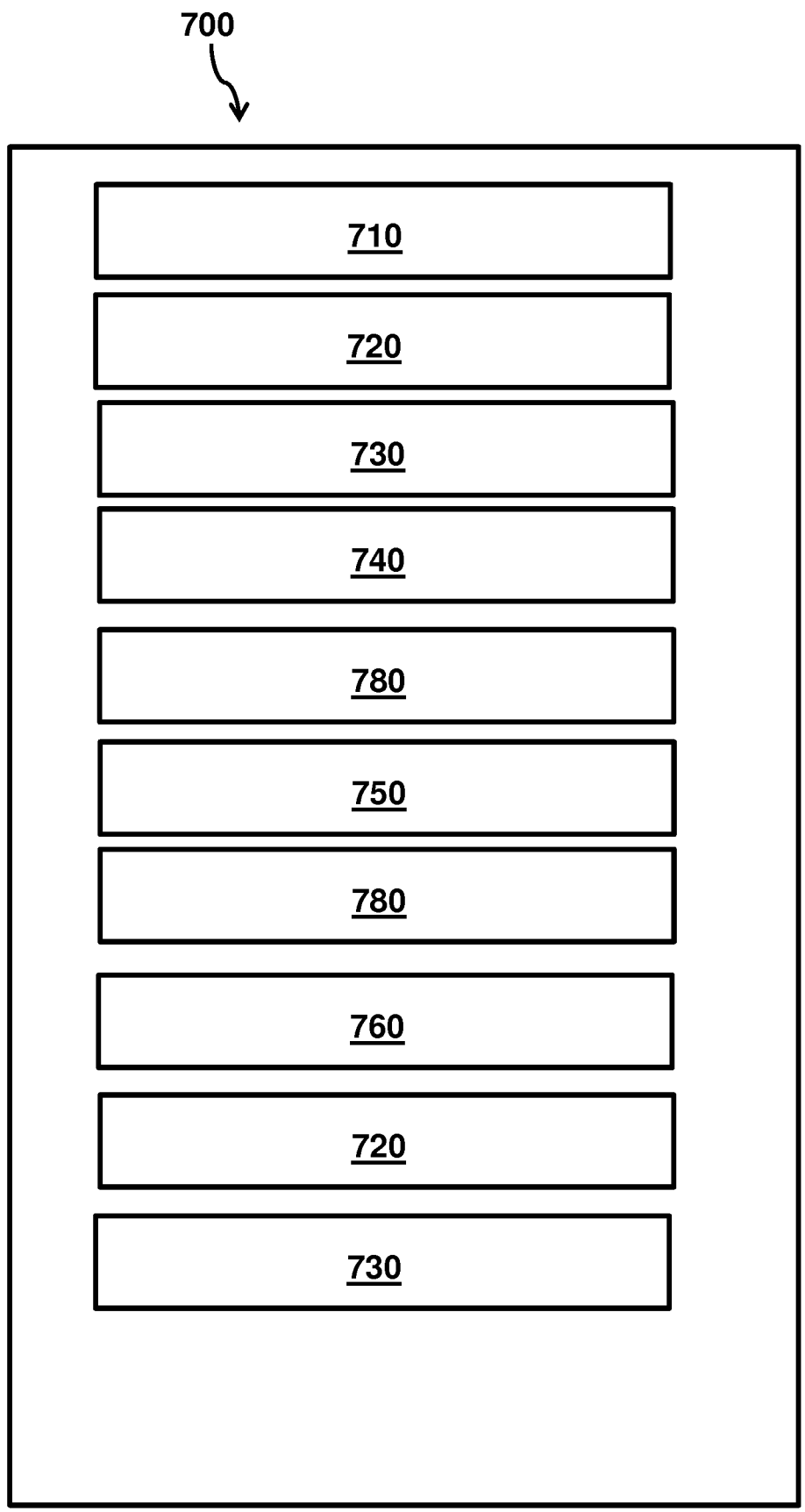
Figure 29:
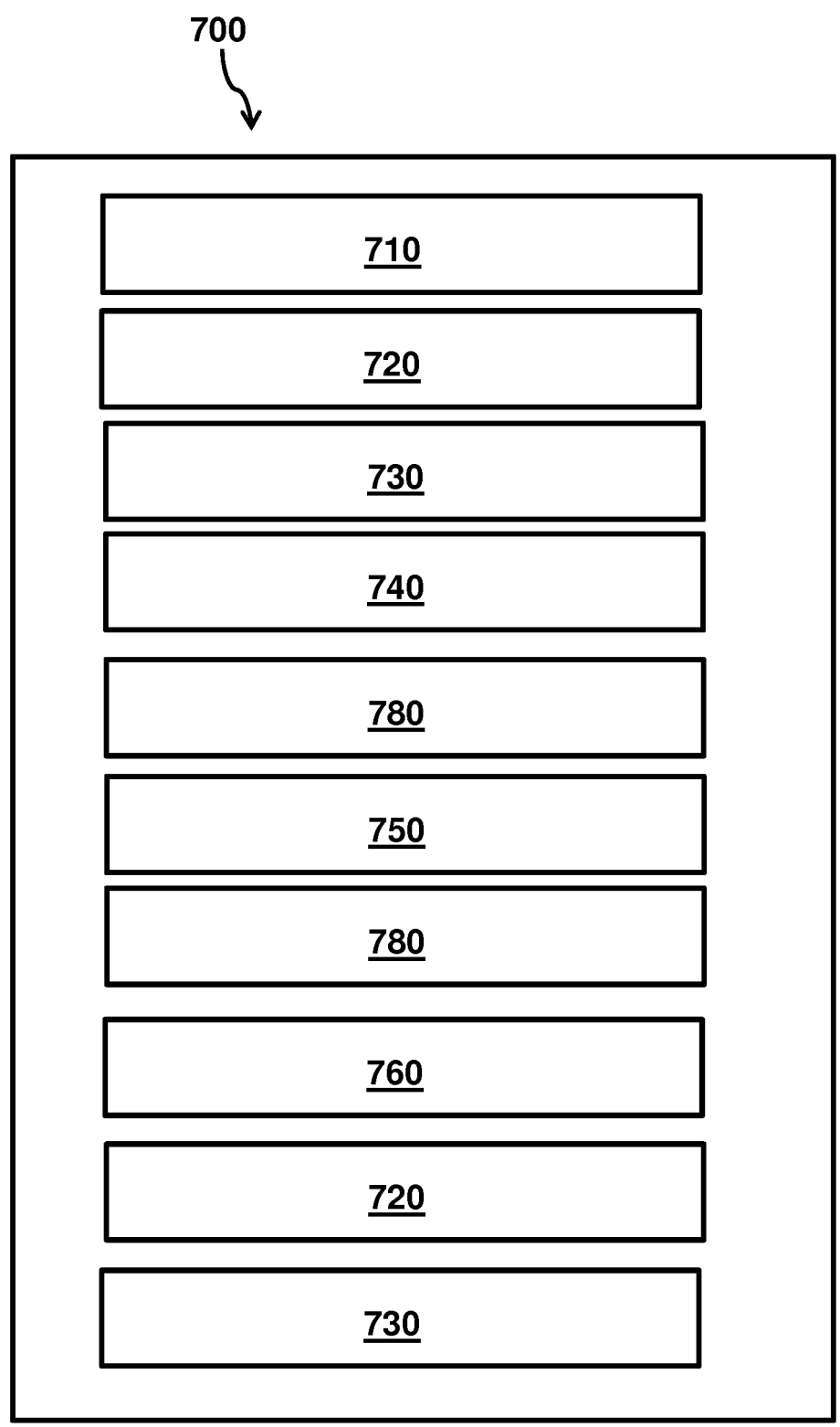

Some of the embodiments will be described in detail, with references to the following Figures, wherein like designations denote like members, wherein:

FIG. 1 illustrates a pile preparation unit;
FIG. 2 illustrates the extraction of a pallet;
FIG. 3 illustrates the extraction of a pallet;
FIG. 4 illustrates the extraction of a pallet;
FIG. 5 illustrates the extraction of a pallet;
FIG. 6 illustrates the extraction of a pallet;
FIG. 7 illustrates the extraction of a pallet;
FIG. 8 illustrates the extraction of a pallet;
FIG. 9 illustrates the insertion of a pallet;
FIG. 10 illustrates the insertion of a pallet;
FIG. 11 illustrates the insertion of a pallet;
FIG. 12 illustrates the insertion of a pallet;
FIG. 13 illustrates the insertion of a pallet;
FIG. 14 illustrates the insertion of a pallet;
FIG. 15 illustrates the insertion of a pallet;
FIG. 16 illustrates the insertion of a pallet;
FIG. 17 illustrates a pile preparation unit with another embodiment of a pallet change module;
FIG. 18 illustrates a pile preparation unit with another embodiment of a pallet change module;
FIG. 19 illustrates the extraction and insertion of a pallet;
FIG. 20 illustrates the extraction and insertion of a pallet;
FIG. 21 illustrates the extraction and insertion of a pallet;
FIG. 22 illustrates the extraction and insertion of a pallet;
FIG. 23 illustrates the extraction and insertion of a pallet;
FIG. 24 illustrates a different view of the pallet change module;
FIG. 25 illustrates a different view of the pallet change module;
FIG. 26 illustrates a pallet of a type for processing;
FIG. 27 illustrates a method of changing support of a pallet;
FIG. 28 illustrates a method of changing a first pallet with a second pallet; and
FIG. 29 illustrates aspects of a method for loading a pallet.

DETAILED DESCRIPTION

FIG. 1 discloses a pile preparation unit 100 for changing a pallet 140 support of a pile of sheets 130. The pile of sheets having a first end 131 and second end 132 and the pallet 140 has a support side 150 supporting the pile of sheets 130 at the first end 131.

The pile of sheets 130 and the pallets 140 is feed in a feed direction 125. The pallets 140 are removed in the feed direction 125

The pile preparation unit 100 has a rotation unit 300 configured with two infeed openings 120 for receiving a pallet 140 with a pile of sheets 130. The rotation unit 300 is configured with a rotating structure 302 to rotate a lift unit 500 about a rotational axis 304.

The lift unit 500 is configured with a lift structure 510 fixed to the rotating structure 302 and having a lift plate 520 movable along the lift structure 510 to engage with the second end 112 of the pile of sheets 130 and to move and position the pile of sheets 130 transverse relatively to the rotational axis 302 providing a portal 630 for changing a pallet 140. This portal 630 is also referred to as a pallet portal 640.

The rotation unit 300 comprises a first conveyor 401 configured to rotate with the rotation structure 300. The first conveyor 401 may act as a first lift plate 521, which in this embodiment rotates with the rotation unit 300. The lift unit 500 comprises a second conveyor 522 configured as a second lift plate 522. In this embodiment the second lift plate 522 may move in the lift unit 300 and thus rotate when the lift unit is rotated by the rotation unit 300.

A portal 630 or pallet portal 640 is created when there is an open space between the first end 131 of the pile of sheets 130 and the first lift plate 521 or when there is an open space between the second end 132 of the pile of sheets 130 and the second lift plate 522.

In one embodiment one or both of the first and second lift plates 521, 522 is a conveyor 400.

In one embodiment the first lift plate 521 is a first conveyor 401 that rotates with the rotation unit 300.

In another embodiment the first plate 521 is a first conveyer 401 that is in the lift unit 500 and thus rotates with the lift unit 500.

FIGS. 2 to 8 illustrate the extraction 650 of a pallet 140. The extraction 650 is done in seven steps.

In FIG. 2 discloses a pile preparation unit 100 for changing a pallet 140 support of a pile of sheets 130. The pile of sheets 130 has been feed into the pile preparation unit 100.

In FIG. 3 the second lift plate 522 clamps down onto the second end 132 of the pile of sheets.

In FIG. 4 the rotation unit 300 rotates the pile of sheets 130 around a rotational axis 320. Hence the pile of sheets 130 is upside/down compared to preceding figures.

In FIG. 5 pallet engagement means or pallet engagement 610 is inserted in the feed direction 125 for engagement with the pallet 140.

In FIG. 6 the pallet engagement means or pallet engagement 610 has been inserted into the pile preparation unit 100 and the pallet engagement means or pallet engagement 610 has engaged with the pallet 140.

FIG. 7 discloses the extraction of the pallet 140.

In a step between FIG. 7 and FIG. 8 the first lift unit 131 clamps down onto the first end 131 of the pile of sheets 130.

In FIG. 8 the rotation unit 300 has rotated the pile of sheets 130 around a rotational axis 320. Hence the pile of sheets 130 is in the same position as in FIG. 1, but without a pallet 140.

FIGS. 9 to 16 illustrate the insertion 652 of a pallet 140.

In FIG. 9 a pallet 140 is inserted into the pile preparation unit 100 by a pallet change module 600 using pallet engagement means or pallet engagement 610.

In FIG. 10 the pallet engagement means or pallet engagement 610 moves the pallet 140 down onto the second end 132 of the pile of sheets 130.

In FIG. 11 the pallet engagement means or pallet engagement 610 extracts leaving the pallet 140 on the second end 132 of the pile of sheets.

In FIG. 12 the extraction of the pallet engagement means or pallet engagement 610 is completed.

FIG. 13 the second lift plate 522 is moved downwards onto the backside of the pallet 140.

In FIG. 14 the rotation unit 300 rotates the pile of sheets 130 around a rotational axis 320. Hence the pile of sheets 130 is upside/down compared to FIGS. 9-13.

In FIG. 15 second lift plate 522 is moved downwards, so the pile of sheets 130 can be removed.

In one embodiment the removal of the pile of sheets is done by a conveyor 400.

In another embodiment the removal of the pile of sheets is done by a forklift.

FIG. 16 is FIG. 15 from a different angle.

In FIGS. 2 to 16 the pile of sheets 130 is flipped so that the second end 132 of the pile of sheets 130 is supported by the support side 150 of the pallet 140.

In another embodiment one or both lift plates 520 are conveyors 400.

In another embodiment none of the lift plates 520 are conveyors 400.

In another embodiment the pallet 140 is removed without adding a new pallet 140.

In another embodiment only one pallet 140 is used.

In another embodiment the pile of sheets 130 has no pallet 140 before insertion into the pile preparation unit 100 and a pallet 140 is added to either the first end 131 and second end 132 or both.

In another embodiment the pile of sheets 130 has no pallet 140 and the pile of sheets 130 is flipped.

In another embodiment a pallet 140 is placed on both the first end 131 and the second end 132 of the pile of sheets 130.

FIGS. 17 to 18 illustrate a pile preparation unit with another embodiment of a pallet change module.

FIG. 17 discloses a pile preparation unit 100 for changing a pallet 140 support of a pile of sheets 130. The pile of sheets having a first end 131 and second end 132 and the pallet 140 has a support side 150 supporting the pile of sheets 130 at the first end 131.

The pile preparation unit 100 has a rotation unit 300 configured with two infeed openings 120 for receiving a pallet 140 with a pile of sheets 130. The rotation unit 300 is configured with a rotating structure 302 to rotate a lift unit 500 about a rotational axis 304.

The pile preparation unit 100 has a pallet change module 600. The pallet change module 600 has a first pallet portal 641 with movable first pallet engagement means or first pallet engagement 611 arranged to extend to an extraction position 660 in the rotation unit 300 and a second pallet portal 642 with movable second pallet engagement means or second pallet engagement 612 arranged to extend to a delivery position 662 in the rotation unit 300 the first and second pallet portal 641, 642 vertically separated.

The extraction position 660 and delivery position 662 is not shown in FIG. 17.

The pile preparation unit 100 has a lift unit 500. The lift unit 500 is configured to move and position the lift plate 520 for the second end 132 of the pile of sheets 130 to be positioned at the respective extraction position 660 and delivery position 662.

The pallets 140 are feed in the feed direction 125.

FIG. 18 discloses the pallet loading unit 620 with pallet loading arms 622.

FIGS. 19 to 23 illustrate extraction and insertion of a pallet.

FIG. 19 discloses a top view of the pile preparation unit 100 also shown in FIG. 17.

In FIG. 20 the pile of sheets 130 have been rotated by the rotation unit 300 around a rotational axis 320. During the rotation the pallet loading unit 620 delivers a second pallet 142 for the second pallet engagement means or engagement 612.

In FIG. 21 the lift unit 500 moves the pile of sheets 130 a bit downwards by lowering of the second lift plate 522. The first pallet 141 is placed in the first pallet portal 641 and the first pallet 141 is therefore at the extraction position 660.

The second pallet 141 is placed at the second pallet engagement means or engagement 612, which is vertically at the same height as the second pallet portal 642; thus the second pallet is at the delivery position 662

In FIG. 22 the second engagement means or engagement 612 moves the second pallet 142 into the second pallet portal 642 to deliver the second pallet 142.

In FIG. 23 the first pallet 141 has been removed by the first pallet engagement means or engagement 611.

The rotation unit 300 may then rotate the pile of sheets 130 around a rotational axis 320. The pile of sheets 130 would then be in the initial position shown in FIG. 19, but with a different pallet 140.

The pile of sheets 130 can then be removed from the pile preparation unit 100.

In one embodiment the removal of the pile of sheets is done by a conveyor 400.

In another embodiment the removal of the pile of sheets is done by a truck.

In FIGS. 19 to 23 the pallet 140 of the pile of sheets 130 is changed from a first pallet 141 to a second pallet 142.

In another embodiment the pallet 140 is changed while flipping the pile of sheets 130.

In another embodiment one or both lift plates 520 are conveyors 400.

In another embodiment none of the lift plates 520 are conveyors 400.

In another embodiment the pallet 140 is removed without adding a new pallet 140.

In another embodiment only one pallet 140 is used.

In another embodiment the pile of sheets 130 has no pallet 140 before insertion into the pile preparation unit 100 is added to either the first end 131 and second end 132 or both.

In another embodiment the pile of sheets 130 has no pallet 140 and the pile of sheets 130 is flipped.

In another embodiment a pallet 140 is placed on both the first end 131 and the second end 132 of the pile of sheets 130.

FIGS. 24 to 25 illustrate a different angle of the pallet change module.

FIG. 26 illustrates a pallet. The pallet is a process pallet having a face with linear recesses. The pallet engagement means or engagement may be spears or rods complementary arranged to engage with the recesses in the pallet.

FIG. 27 illustrates a method 700 of changing a pallet 140 support of a pile of sheets 130 with a first end 131 and a second end 132 where the pallet 140 has a support side 150 supporting the pile of sheets 130 at the first end 131. The method comprises of a series of acts.

There may be an act of positioning 710 the pallet 140 supporting the pile of sheets 130 on a first conveyor 401 in a rotation unit 300.

There may be an act of engaging 720 a second conveyor 402 with the second end 132 of the pile of sheets 130.

There may be an act of rotating 730 the first and second conveyors 401, 402 upside down using the rotation unit 300.

There may be an act of releasing 740 the first conveyor 400 from the first end 131 of the pile of sheets 130.

There may be an act of extracting 750 the pallet 140 from the first end 131 of the pile of sheets 131.

There may be an act of engaging 720 the first conveyor 401 with the first end 131 of the pile of sheets 130.

There may be an act of rotating 730 the first and second conveyors 401, 402 downside-up using the rotation unit 300. This act may be without the pallet 140.

There may be an act of releasing 740 the second conveyor 402 from the second end 132 of the pile of sheets 130.

There may be an act of inserting 760 the same pallet 140 or another pallet 140 on the second end 132 of the pile of sheets 130.

There may be an act of engaging 720 the second conveyor 402 with the second end 132 of the pile of sheets 130.

There may be an act of rotating 730 the first and second conveyors 401, 402 upside down using the rotation unit 300. This act may be with the pallet 140.

There may be an act of ejecting 770 the pallet 140 supporting the pile of sheets 130 from the second conveyor 402.

FIG. 28 illustrates a method 700 of changing a pallet 140 support of a pile of sheets 130 with a first end 132 and second end 134 where the pallet 140 has a support side 150 supporting the pile of sheets 130 at the first end 131, where the changing is from a first pallet 141 to a second pallet 142. The method comprises of a series of acts.

There may be an act of positioning 710 the pallet 140, supporting the pile of sheets 130 on a first conveyor 401 in a rotation unit 300.

There may be an act of engaging 720 a lift plate 520 is arranged to move in a lift unit 500 with the second end 132 of the pile of sheets 130.

There may be an act of rotating 730 the first pallet 141 with the pile of sheets 130 upside down using the rotation unit 300.

There may be an act of releasing 740 the first conveyor 401 from the first end 131 of the pile of sheets 140 by moving or lowering the lift plate 520, creating a portal 630 for extraction and insertion of a pallet 140.

There may be an act of aligning 780 the first pallet 141 to an extraction position 660 by moving the lift plate 520.

There may be an act of extracting 750 the first pallet 141 from the first end 132 of the pile of sheets 130 using the first pallet engagement means or engagement 610 operated in the first pallet portal 641 at the extraction position 660.

There may be an act of aligning 780 the second end 132 of the pile of sheets 130 to an insertion position 662 or delivery position by moving the lift plate 520.

There may be an act of inserting 760 the second pallet 142 to the second end 132 of the pile of sheets 130 using the second pallet engagement means or engagement 612 operated in the second pallet portal 642 at the insertion position 662 or delivery position.

There may be an act of engaging 720 the second pallet 142 with the first conveyor 401 by moving the lift plate 520.

There may be an act of rotating 730 the second pallet 142 with the pile of sheets 130 downside up using the rotation unit 300.

There may be further acts for loading a pallet from a pallet storage and onto or into the pallet change module.

The act of loading may comprise one or more of the following acts.

There may be an act of attaching 790 a second pallet 142 of the second type 160 on the outside of the rotation unit 300.

There may be an act of rotating 730 the attached second pallet 142 in the same rotation movement.

There may be an act of releasing 740 the second pallet 142 to the second pallet portal 642.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

| Item | Reference Number |
|---|---|
| Pile preparation unit | 100 |
| Infeed opening | 120 |
| Feed direction | 125 |
| Pile of sheets | 130 |
| First end | 131 |
| Second end | 132 |
| Pallet | 140 |
| First pallet | 141 |
| Second pallet | 142 |
| Support side | 150 |
| Pallet end | 152 |
| Rotation unit | 300 |
| Rotating structure | 310 |
| Rotational axis | 320 |
| Conveyor | 400 |
| First conveyor | 401 |
| Second conveyor | 402 |
| Lift unit | 500 |
| Lift structure | 510 |
| Lift plate | 520 |
| First lift plate | 521 |
| Second lift plate | 522 |
| Pallet change module | 600 |
| Pallet engagement means or pallet engagement | 610 |
| First pallet engagement means or first pallet engagement | 611 |
| Second pallet engagement means or second pallet engagement | 612 |
| Pallet loading unit | 620 |
| Pallet loading arm | 622 |
| Portal | 630 |
| Pallet portal | 640 |
| First pallet portal | 641 |
| Second pallet portal | 642 |
| Extraction | 650 |
| Insertion | 652 |
| Extraction position | 660 |
| Insertion/Delivery position | 662 |
| Method | 700 |
| Positioning | 710 |
| Engaging | 720 |
| Rotating | 730 |
| Releasing | 740 |
| Extracting | 750 |
| Inserting | 760 |
| Ejecting | 770 |
| Aligning | 780 |
| Attaching | 790 |

The invention claimed is:

1. A pile preparation unit for changing a pallet support of a pile of sheets with a first end and a second end, wherein the pallet has a support side supporting the pile of sheets at the first end, the pile preparation unit comprising:
a rotation unit configured with an infeed opening for receiving a pallet with a pile of sheets, the rotation unit configured with a rotating structure to rotate a lift unit about a rotational axis, wherein the rotating structure comprises a cylindrical body supporting the lift unit, wherein the cylindrical body is supported on two sets of rollers adapted for rotating the cylindrical body;
wherein the lift unit comprises a first lift plate and a second lift plate, each configured to move and position in the lift structure to engage to the respective first end and second end of the pile of sheets;
wherein the lift unit is configured with a lift structure fixed to the rotating structure and has the second lift plate movable along the lift structure to engage with the second end of the pile of sheets and to move and position the pile of sheets transverse, relative to the rotational axis providing a portal for changing a pallet, wherein the rotation unit comprises a first conveyor configured as the first lift plate configured to rotate with the rotating structure,
wherein the pile preparation unit is further configured with a pallet change module including a pallet portal with movable pallet engagement forks for engaging with a pallet for extraction from and insertion into a portal formed in an upper section of the rotation unit,
wherein the pallet change module is at least one of:
adapted for exchanging a first pallet with a second pallet, wherein the pallet change module includes
a first pallet portal with movable first pallet engagement forks arranged to extend to an extraction position in the rotation unit; and
a second pallet portal with movable second pallet engagement forks arranged to extend to a delivery position in the rotation unit;
wherein the first pallet portal and the second pallet portal are vertically separated; and
wherein the lift unit is configured to move and position the respective lift plate for the respective pallet end of the pile of sheets to be positioned at the respective extraction position and delivery position, and
adapted for supporting the second end of the pile of sheets on the same pallet, wherein the lift unit includes a second conveyor configured as a second lift plate, wherein the pallet engagement forks are inserted in a feed direction parallel to the rotational axis for extraction of the pallet from the first end and for delivery of the same pallet to the second end of the pile of sheets after rotation of the rotating structure.

2. The pile preparation unit according to claim 1, wherein the pallet change module is arranged on side of the rotation unit and to extend the pallet engagement, the first or second or both pallet engagement into the rotation unit from a transverse direction to the rotational axis.

3. The pile preparation unit according to claim 2, further comprising a pallet loading unit arranged on the opposite side of the pallet change module and fixed to the rotation unit, the pallet loading unit configured to engage with and support a second pallet during rotation of the rotating unit and configured to release the second pallet on the second pallet engagement.

4. The pile preparation unit according to claim 1 further comprising a pallet loading unit configured with a pallet loading arm connectable to the rotation unit and configured to engage with and support a pallet during rotation of the rotating unit and configured to release the pallet when up-side down.

5. A method of changing a pallet support of a pile of sheets with a first end and a second end where the pallet has a support side supporting the pile of sheets at the first end, the method comprising acts of:
- positioning the pallet supporting the pile of sheets on a first conveyor in a rotation unit;
- engaging a second conveyor with the second end of the pile of sheets;
- rotating the first and second conveyors upside down using the rotation unit;
- releasing the first conveyor from the first end of the pile of sheets;
- extracting the pallet from the first end of the pile of sheets along a feed direction parallel to a rotational axis;
- engaging the first conveyor with the first end of the pile of sheets;
- rotating the first and second conveyors downside up using the rotation unit;
- releasing the second conveyor from the second end of the pile of sheets;
- inserting the same pallet on the second end of the pile of sheets along the feed direction;
- engaging the second conveyor with the second end of the pile of sheets;
- rotating the first and second conveyors upside down using the rotation unit;
- ejecting the pallet supporting the pile of sheets from the second conveyor.

6. A method of changing a pallet support of a pile of sheets with a first end and second end where the pallet has a support side supporting the pile of sheets at the first end, where the changing is from a first pallet to a second pallet, the method comprising acts of:
- positioning the pallet, supporting the pile of sheets on a first rotation unit;
- engaging a lift plate arranged to move in a lift unit with the second end of the pile of sheets;
- rotating the first pallet with the pile of sheets upside down using the rotation unit;
- releasing the first conveyor from the first end of the pile of sheets by moving or lowering the lift plate, creating a portal for extraction and insertion of a pallet;
- aligning the first pallet to an extraction position by moving the lift plate;
- extracting the first pallet from the first end of the pile of sheets using first pallet engagement forks operated in a first pallet portal at the extraction position;
- aligning the second end of the pile of sheets to an insertion position or delivery position by moving the lift plate;
- inserting the second pallet to the second end of the pile of sheets using second pallet engagement forks operated in a second pallet portal at the insertion position or delivery position;
- engaging the second pallet with the first conveyor by moving the lift plate;
- rotating the second pallet with the pile of sheets downside up using the rotation unit;
- attaching a second pallet of the second type on the outside of the rotation unit;
- rotating the attached second pallet in the same rotation movement; and
- releasing the second pallet to the second pallet portal,
wherein the first pallet portal and the second pallet portal are vertically separated.

* * * * *